United States Patent
Ryan et al.

(10) Patent No.: US 11,944,051 B2
(45) Date of Patent: Apr. 2, 2024

(54) PLANTER WITH ELEVATED INTERNAL PORTION AND WATER PRESERVATION FEATURES

(71) Applicant: Classic Home & Garden, LLC, Monroe, CT (US)

(72) Inventors: Fred Joseph Ryan, Trumbull, CT (US); Hamilton Scott Team, Cumming, GA (US)

(73) Assignee: CLASSIC HOME & GARDEN, LLC., Monroe, CT (US)

( * ) Notice: Subject to any disclaimer, the term of this patent is extended or adjusted under 35 U.S.C. 154(b) by 84 days.

(21) Appl. No.: 17/394,916

(22) Filed: Aug. 5, 2021

(65) Prior Publication Data

US 2021/0360870 A1 Nov. 25, 2021

Related U.S. Application Data

(63) Continuation-in-part of application No. 17/066,939, filed on Oct. 9, 2020, which is a continuation of application No. 15/485,936, filed on Apr. 12, 2017, now Pat. No. 10,798,880.

(60) Provisional application No. 62/324,051, filed on Apr. 18, 2016.

(51) Int. Cl.
*A01G 9/02* (2018.01)
*A01G 9/04* (2006.01)

(52) U.S. Cl.
CPC ............... *A01G 9/02* (2013.01); *A01G 9/04* (2013.01)

(58) Field of Classification Search
CPC .......... A01G 9/042; A01G 9/04; A01G 27/06; A01G 9/02
See application file for complete search history.

(56) References Cited

U.S. PATENT DOCUMENTS

| | | | | |
|---|---|---|---|---|
| 3,220,144 A | * | 11/1965 | Green | A01G 27/06 47/80 |
| 4,096,663 A | * | 6/1978 | Silver | A01G 27/06 47/80 |
| 4,315,382 A | * | 2/1982 | Kay | A01G 9/042 47/71 |
| 5,125,184 A | * | 6/1992 | Anderson | A01G 27/06 47/73 |

FOREIGN PATENT DOCUMENTS

KR 200420135 Y1 * 7/2006
KR 200434750 Y1 * 12/2006

* cited by examiner

*Primary Examiner* — Christopher D Hutchens
(74) *Attorney, Agent, or Firm* — Tutunjian & Bitetto, P.C.

(57) ABSTRACT

A planter includes an interior surface and a riser extending from a bottom of the interior surface and including a space between the riser and lateral walls of the planter. The riser includes an open-top recess formed in a top portion of the riser. A plate including a protrusion extending from a bottom side of the plate and forming an open-top reservoir on a top side of the protrusion. The protrusion is configured to be coupled with the recess to secure the plate to the riser.

13 Claims, 16 Drawing Sheets

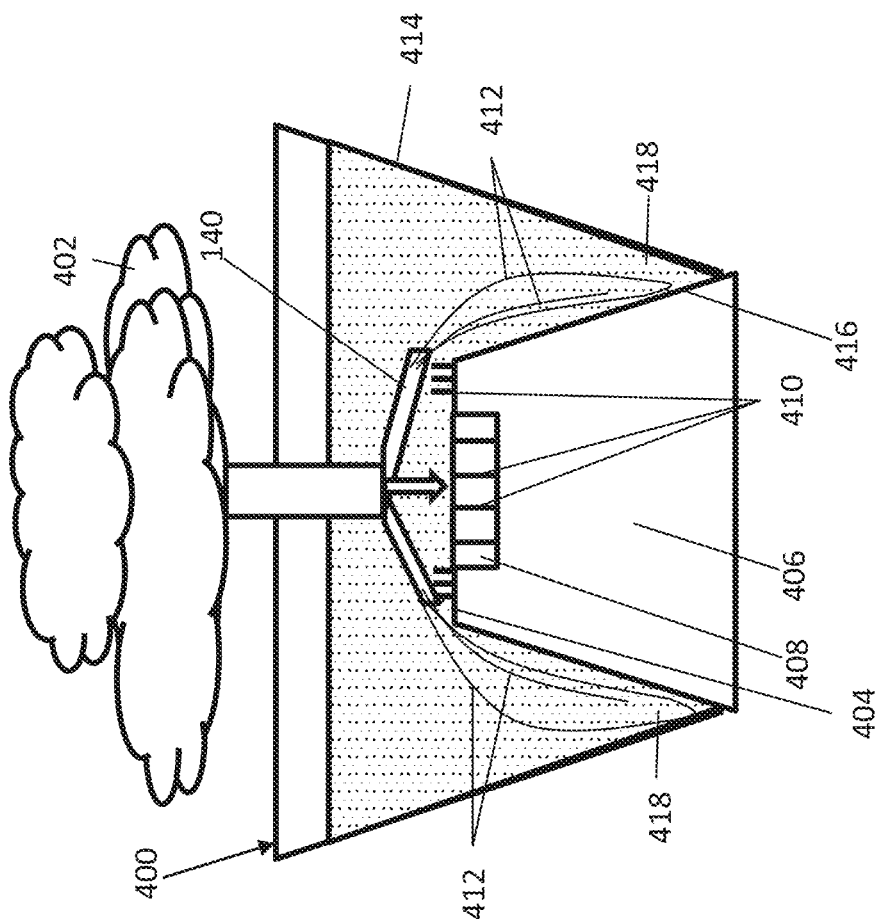

PLANTER WITH ELEVATED INTERNAL PORTION AND WATER PRESERVATION FEATURES

BACKGROUND

Technical Field

The present invention relates to planters, and more particularly to planters having an elevated portion for propping up a smaller planter therein.

Description of the Related Art

Planters provide a decorative element in outside or inside environments. Planters can become cumbersome when the planter itself is large, made from dense materials, like concrete, and is filled with soil, especially wet soil.

SUMMARY

A planter includes an interior surface. A riser extends from a bottom of the interior surface and forms a space between the riser and lateral walls of the planter. A top portion of the riser is configured to receive and support a plant therein.

Another planter includes an interior surface. A riser extends from a bottom of the interior surface and forms a space between the riser and lateral walls of the planter. A reservoir is formed in a top portion of the riser. The top portion is configured to receive and support a plant therein.

A method for water preservation includes providing a planter with an interior surface; a riser extending from a bottom of the interior surface and including a space between the riser and lateral walls of the planter; and a reservoir formed in a top portion of the riser, the top portion being configured to receive and support a pot therein; supporting a plant on the top portion of the riser; and preserving water by storing water in the reservoir and in the spaces between the riser and lateral walls of the planter.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein:

FIG. 7 is a cross-sectional view of a planter having a non-potted plant above a reservoir in a riser that supports the plant and sowing roots reaching water spacers, in accordance with another embodiment of the present invention;

DETAILED DESCRIPTION

Figure 2:
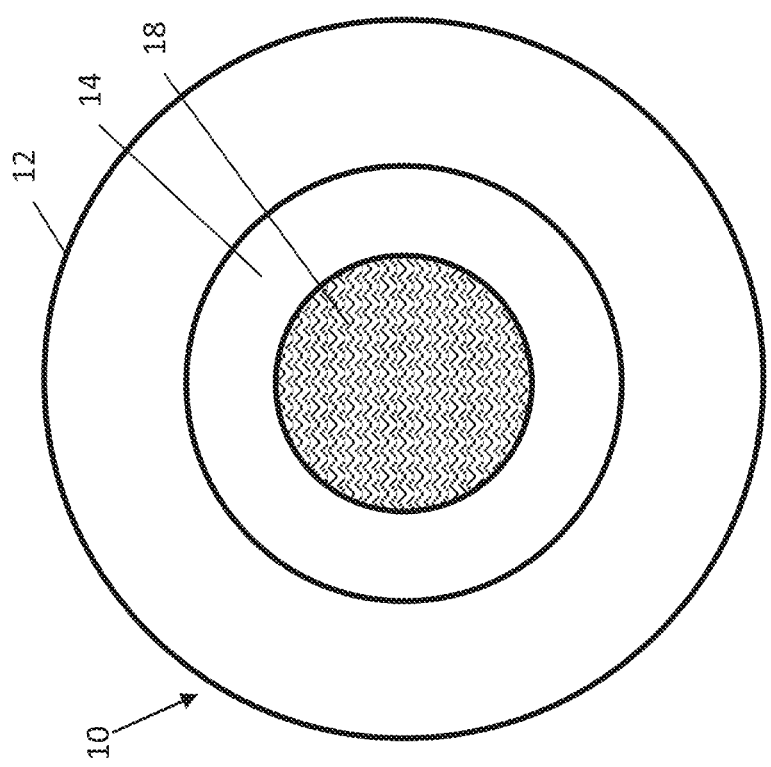
FIG. 2 is a top perspective view of the planter of FIG. 1 showing a reservoir for storing water for a plant supported therein, in accordance with one embodiment of the present invention.

In accordance with the present principles, planters are provided that have a riser (e.g., column or plateau) formed within an interior of the planter to support a smaller planter or a plant. The plateau provides sufficient height for the plant or smaller planter to be visible outside the larger planter. The larger planter may include hollow spaces to reduce the weight of the planter by reducing the amount of soil needed. In useful embodiments, the riser may provide other features to help support and nourish the smaller planter or the plant installed within the larger planter. In one embodiment, a top portion of the riser provides a cupped region or reservoir for storing water. In another embodiment, the riser can be configured to provide a reservoir for water about an internal base of the larger planter.

The planters in accordance with the present principles may be fabricated by molding processes using plastics; however, other materials are contemplated as well. For example, the planters may include metal construction, concrete, wood, etc. In one embodiment, the planters are a monolithic construction (e.g., one piece).

It is to be understood that the present invention will be described in terms of a given illustrative architectures; however, other architectures, structures, materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, may be used herein for ease of description to describe one element's or feature's relationship to another element(s) or feature(s) as illustrated in the FIGs. It will be understood that the spatially relative terms are intended to encompass different orientations of the device in use or operation in addition to the orientation depicted in the FIGs. For example, if the device in the FIGs. is turned over, elements described as "below" or "beneath" other elements or features would then be oriented "above" the other elements or features. Thus, the term "below" can encompass both an orientation of above and below. The device may be otherwise oriented (rotated 90 degrees or at other orientations), and the spatially relative descriptors used herein may be interpreted accordingly. In addition, it will also be understood that when a layer is referred to as being "between" two layers, it can be the only layer between the two layers, or one or more intervening layers may also be present.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present concept.

Figure 1:
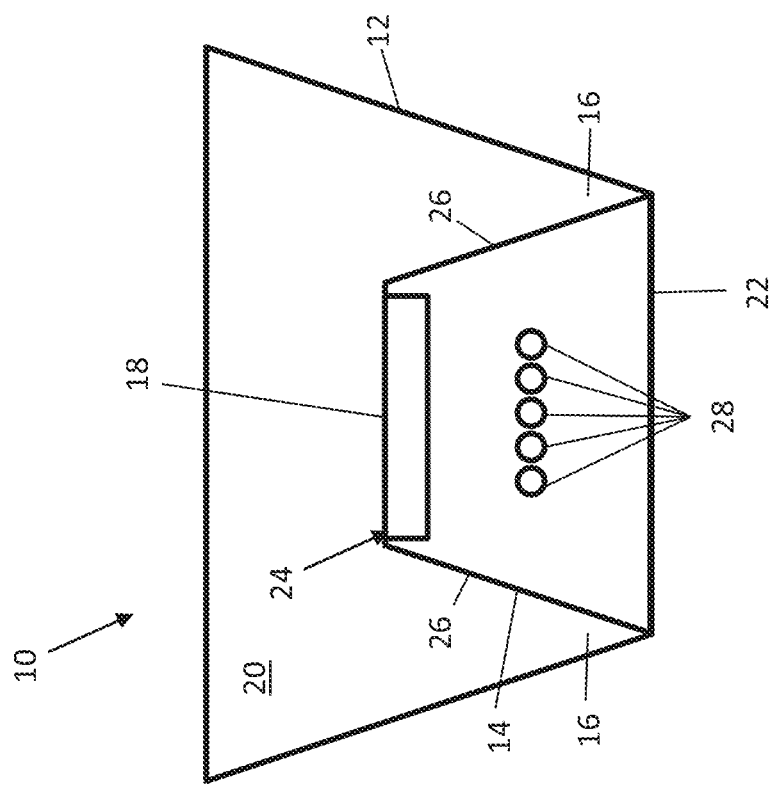
FIG. 1 is a cross-sectional view of a planter having a riser for supporting a plant, in accordance with one embodiment of the present invention.

Referring now to the drawings in which like numerals represent the same or similar elements and initially to FIG. 1, a cross-sectional view of a planter 10 is shown in accordance with the present principles. The planter 10 may include a flowerpot or other ornamental container. The planter 10 is illustratively shown having a particular shape; however, it should be understood that the planter 10 may include any shape and may be scaled to any size. The planter 10 includes an external wall 12 that defines an interior space 20. Within the interior space 20, a riser 14 is coupled to a bottom 22 of the planter 10. The riser 14 may be connected to the bottom 22, be connected to the wall 12 or a combination of both. The riser 14 may be solid or hollow and connected to the bottom 22 or function as the bottom or the planter (e.g., integrally formed with the planter). The riser 14 may include holes in sides thereof as needed.

The riser 14 provides an elevated portion or top portion 24, which can be configured to receive a plant or plants, another planter or another object. The top portion 24 may be flat, pitched or may include a reservoir 18. The reservoir 18 can also include a pitched bottom and may have weep holes formed through side walls of the reservoir 18. In use, the reservoir 18 may be filled with water, a water-absorbing medium, gravel, soil or other materials. The reservoir 18 may be configured to receive a bottom of another planter or pot. In this way, the pot can be stably supported when filling the planter 10 with soil or other media or for setting up the planter 10 for other purposes.

The riser 14 may be integrally formed with the other portions of the planter 10. The planter 10 may include formed metal, molded plastic, wood or combinations of these and/or other materials. The riser 14 may include straight, curved or otherwise shaped side walls 26. The side walls 26 form a space 16 between the planter walls 12 and/or the bottom 22. Space 16 is sealed using the walls 26, walls 12 and/or the bottom 22 in some embodiments to trap water therein. The riser 14 reduces the internal space 20 (volume) of the planter 10. In this way, less soil or other media is needed to fill the planter 10. In addition, the space 16 is narrowed so that when the plant in the planter 10 is watered, the water level in the planter rises faster with less water due to the reduced volume. In other embodiments, the riser 14 may include an insert, which can be placed within an existing planter.

In accordance with the present principles, planter 10 preserves water over conventional planters. Water preservation is achieved in a plurality of ways. One way includes catching water in the reservoir 18 so that the water is available at the roots of the plant. Another way includes reducing the space 16 to cause the water level to rise higher with less water so that the water is available closer to the root system of the plant. In conventional planters, water is wasted by dropping to the bottom of the planter and/or draining out of the bottom of the planter. In order to keep the soil moist, a much larger volume of water is needed. In accordance with the present principles, the shape and limited volume of the spacer 16 between the walls 12 of the planters and the walls 26 of the riser 14 store water therein and provide water to a higher position in the planter 10 with less water needed due to the restricted shape of the space 16.

In accordance with one embodiment, riser 14 may optionally include weep holes 28 along its surfaces 26 to limit the water height. The reservoir 18 may also optionally include weep holes (not shown) in its sidewalls (or in its bottom) to limit the water height. The planter 10 may include weep holes (not shown) through the bottom surface 22 or through lateral walls 12 at a height to limit water collection above the weep holes. The bottom surface weep holes can communicate with the weep holes 28. The riser 14 may be hollow, solid or a combination thereof.

Watering the planter 10 needs less water than conventional planters. The amount of water is reduced and the water used to moisten the soil is more efficiently employed. The water savings is greatly enhanced and amplified when considering a large number of planters.

Referring to FIG. 2, a top view of the planter 10 is illustratively shown. The reservoir 18 is depicted as a circular shape; however any suitable shape may be employed, e.g., square, rectangle, triangle, hexagon, etc. In addition, the riser 14 is depicted as a conical shape, but may include a cylindrical shape, a rectangular shape, multiple columns, etc. The planter 10 is also depicted as a circular shape; however any suitable shape may also be employed, e.g., square, rectangle, triangle, hexagon, etc.

Figure 3:
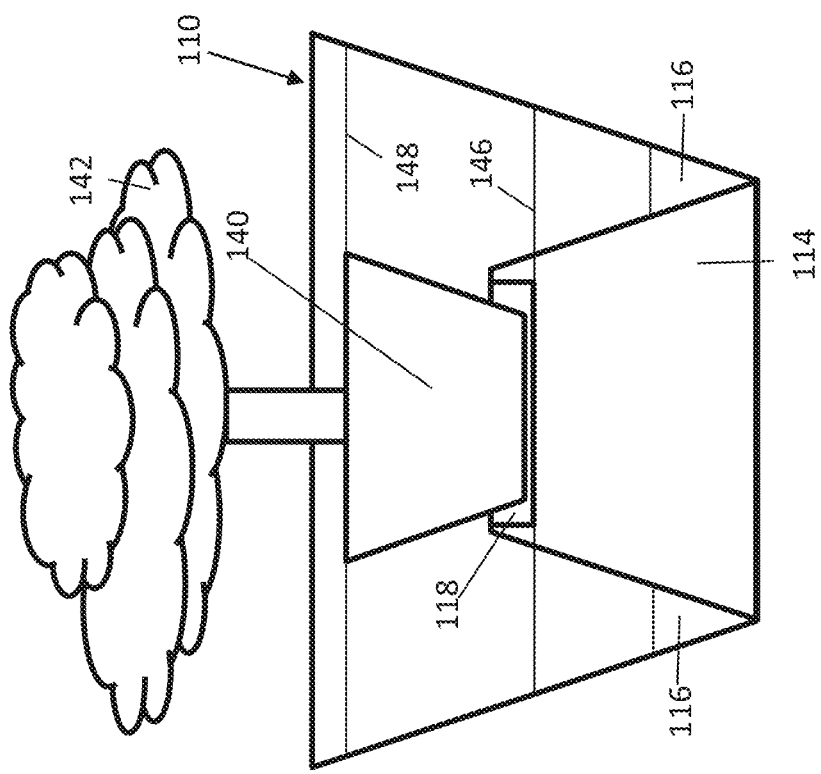
FIG. 3 is a partial cross-sectional view of a planter having a riser with a reservoir that supports a plant, in accordance with another embodiment of the present invention.

Referring to FIG. 3, a planter 110 in accordance with one embodiment is shown having a potted plant 142. The plant 142 grows from a pot 140. The pot 140 may include holes (not shown) through a bottom thereof. The holes in the pot 140 can exchange water present in a reservoir 118 formed in a riser 114. The reservoir 118 may be configured to accommodate standard pot sizes. The plant 142 may be dropped into the planter 110 to create a higher perceived value for the container. The pot 140 may be secured to the planter 110 at the reservoir 118, for example, the reservoir 18 and the pot may include snap fit features, the reservoir 118 may include protrusions that fit into the holes in the pot 140, an adhesive may be employed, etc.

While any level of soil may be employed in the planter 110, the soil level may preferably be between line 146 and line 148. The pot 140 may be completely buried (line 148) or the pot 140 may be completely unburied (line 146). Water settling in areas 116 is available for the plant 142 for any roots that have grown out of the pot 140 without the need to soak an entire volume of water that would otherwise occupy the region beneath the riser 114.

Figure 4:
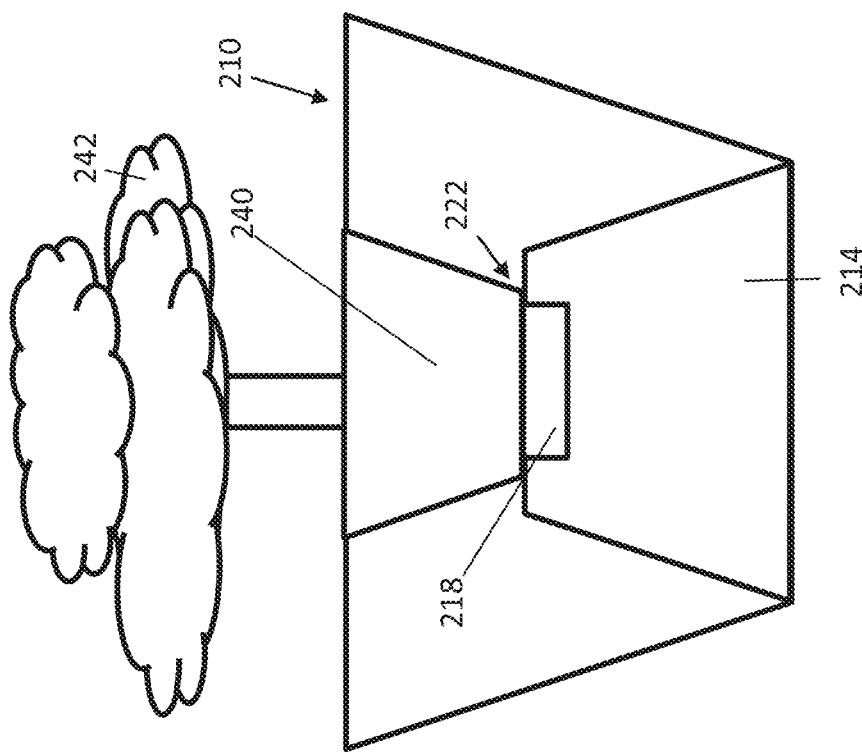
FIG. 4 is a partial cross-sectional view of a planter having a riser with a reservoir and an area above the reservoir that supports a plant, in accordance with another embodiment of the present invention.

Referring to FIG. 4, a planter 210 in accordance with one embodiment is shown having a potted plant 242. The plant 242 grows from a pot 240. The pot 240 may include holes (not shown) through a bottom thereof. The holes in the pot 240 can exchange water present in a reservoir 218 formed in a riser 214. The pot 240 sits on an area 222 over the reservoir 218. The area 222 may be configured to accommodate standard pot sizes. The plant 242 may be dropped into the planter 210 to create a higher perceived value for the container. The pot 240 may be secured to the planter 210 at the area 222 and/or the reservoir 218, for example, the area 222 and the pot 240 may include snap fit features, the area 222 or reservoir 218 may include protrusions that fit into the holes in the pot 240, an adhesive may be employed, etc.

Any level of soil may be employed in the planter 210. The reservoir 218 will not include the pot 240 within it so that the roots are not sitting in the water of the reservoir 218.

Figure 5:
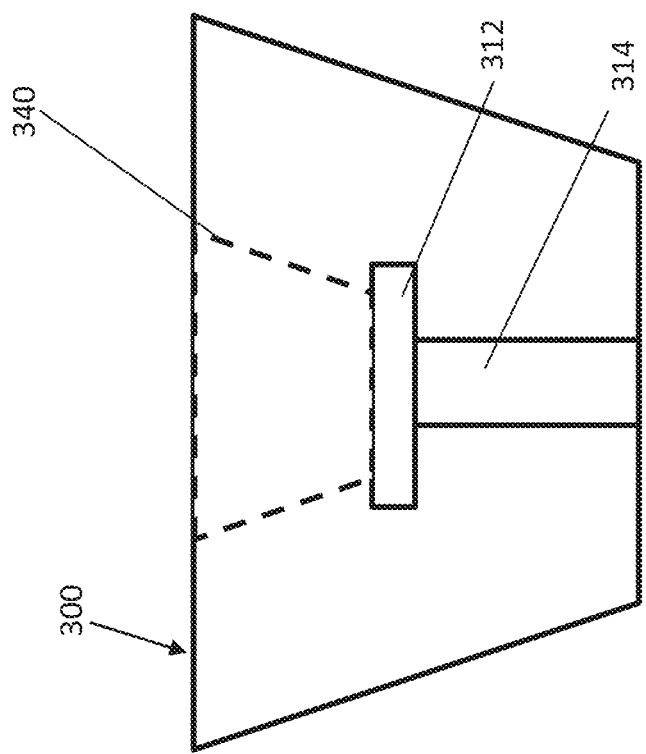
FIG. 5 is a partial cross-sectional view of a planter having a columnar riser with a platform that supports a plant, in accordance with another embodiment of the present invention.

Referring to FIG. 5, in alternate embodiments, a riser 314 may include different shapes within a planter 300. As depicted in FIG. 5, the riser 314 includes a column that supports a platform 312. The platform 312 may include a landing or other features to support a pot 340 when introduced.

Figure 6:
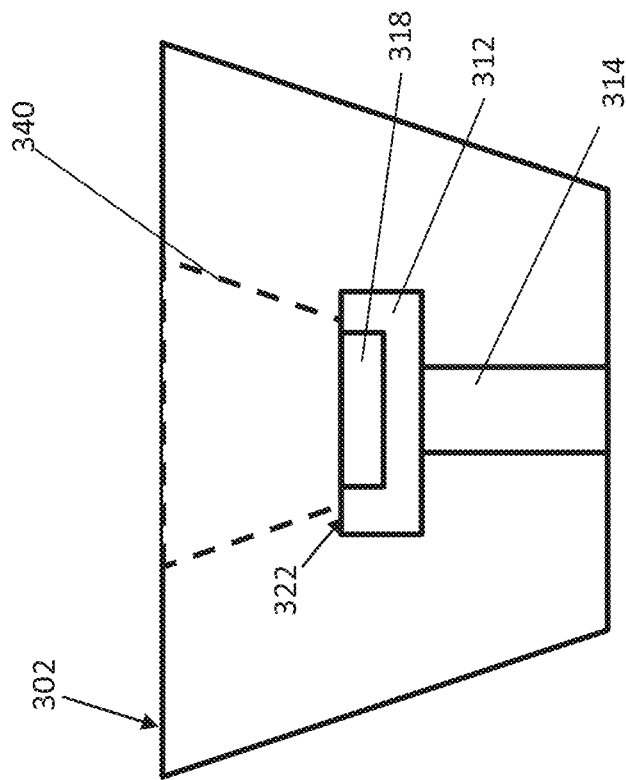
FIG. 6 is a partial cross-sectional view of a planter having a columnar riser with a platform having an area above the reservoir that supports a plant, in accordance with another embodiment of the present invention.

Referring to FIG. 6, in another embodiment, the riser 314 includes a column that supports a platform 310 in a planter 302. The platform 310 may include a landing or other features to support a pot 340 when introduced. The platform 310 includes a reservoir 318. The pot 340 may include holes (not shown) in a bottom thereof. The holes in the pot 340 can exchange water present in the reservoir 318. The pot 340 sits on the reservoir 318 or an area 322 (like area 222 in FIG. 4) over the reservoir 318. The reservoir 318 or area 322 may be configured to accommodate standard pot sizes. The pot 340 may be secured to the planter 302 at the area 322 and/or the reservoir 318, for example. The reservoir 318 (or area 322) and the pot 340 may include snap fit features, may include protrusions that fit into the holes in the pot 340, may include adhesives, etc.

Referring to FIG. 7, any one of the planters shown or described herein may be employed to support a potted plant of a plant without a pot. A planter 400 includes a plant 402 supported by a top portion 404 of a riser 406. The top portion 404 may include a reservoir 408 or features 410 for supporting or stabilizing the plant 402. The plant 402 includes roots 412 that may grow down to spaces 418 between a wall 414 of the planter 400 and a wall 416 of the riser 406. Reservoir 408 can include a mesh or porous media for holding watering and supporting root growth and stabilization.

Figure 8:
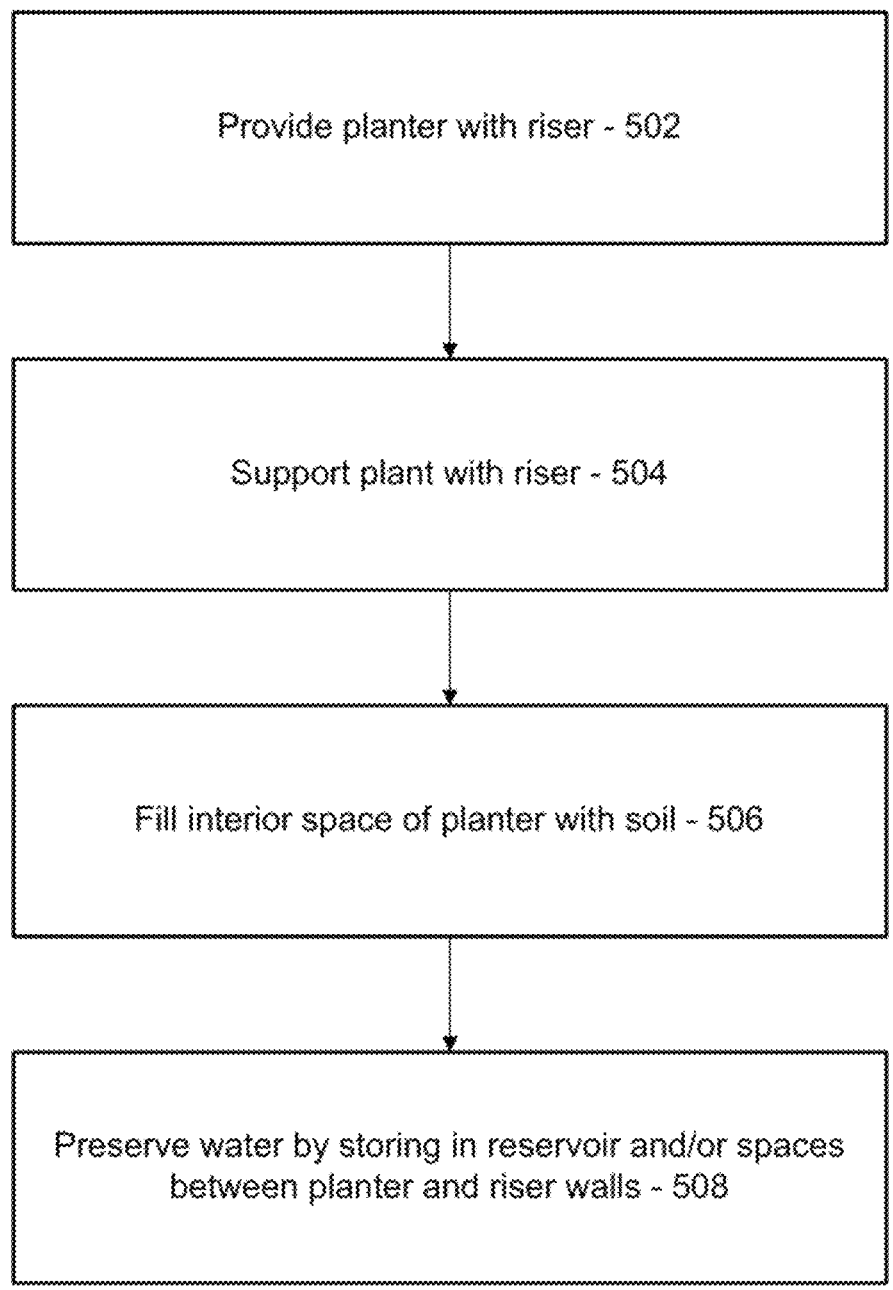
FIG. 8 is a block/flow diagram showing methods for water preservation using planters, in accordance with illustrative embodiments of the present invention.

Referring to FIG. 8, methods for water preservation using a planter are illustratively described and shown in accordance with the present principles. In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In block 502, a planter is provided having an interior surface; a riser extending from a bottom of the interior surface and including a space between the riser and lateral walls of the planter, and a reservoir formed in a top portion of the riser, the top portion being configured to receive and support a pot therein. In block 504, a plant is supported on the top portion of the riser. The plant may be potted or not potted. In block 506, soil or other media may be employed to fill the interior space in the planter. The volume of the riser is not filled. This reduces the amount of soil or other media needed to fill the interior space. In block 508, the plant is watered and water is preserved by storing water in the reservoir (if present) and in the spaces between the riser and lateral walls of the planter.

Figure 9:
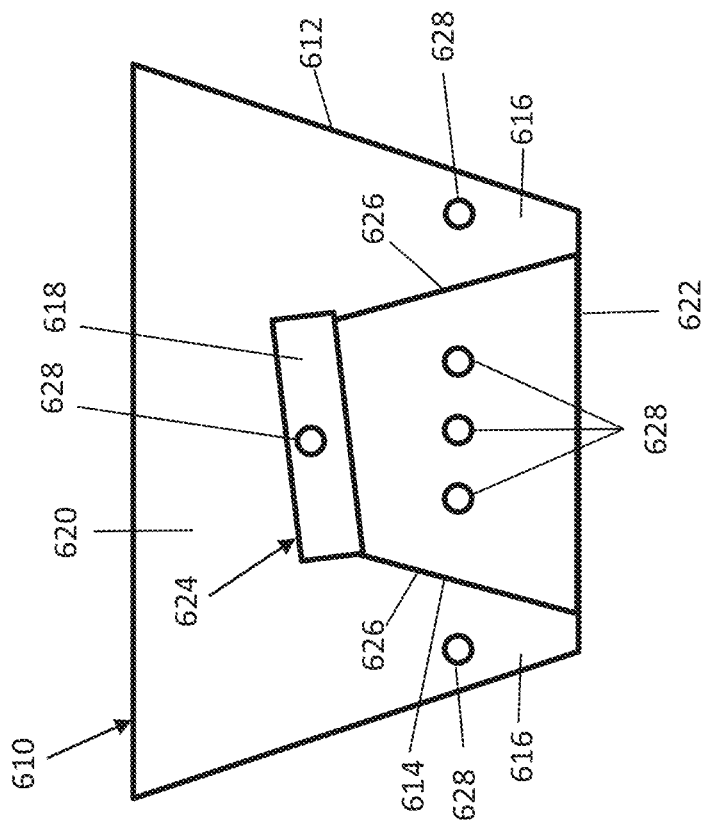
FIG. 9 is a cross-sectional view of another planter having a riser for supporting a plant, in accordance with another embodiment of the present invention.

Referring to FIG. 9, a cross-sectional view of a planter 610 is shown in accordance with another embodiment. The planter 610 may include a flowerpot or other ornamental container. The planter 610 is illustratively shown having a particular shape; however, it should be understood that the planter 610 may include any shape and may be scaled to any size. The planter 610 includes an external wall 612 that defines an interior space 620. Within the interior space 620, a riser 614 is coupled to a bottom 622 of the planter 610. The riser 614 may be connected to the bottom 622, be connected to the wall 612 or a combination of both. The riser 614 may be solid or hollow and connected to the bottom 622 or function as the bottom or the planter (e.g., integrally formed with the planter). The riser 614, the lateral walls 612 of the planter 610 and/or the reservoir 618 can have weep holes 628 formed therein.

The riser 614 provides an elevated portion or top portion 624, which can be configured to receive a plant or plants, another planter or another object. The top portion 624 may be flat, pitched or may include a reservoir 618. The reservoir 618 can also include a pitched bottom and may have weep holes formed through side walls of the reservoir 618. In use, the reservoir 618 may be filled with water, a water-absorbing medium, gravel, soil or other materials. The reservoir 618 may be configured to receive a bottom of another planter or pot. In this way, the pot can be stably supported when filling the planter 610 with soil or other media or for setting up the planter 610 for other purposes.

The riser 614 may be integrally formed with the other portions of the planter 610. The planter 610 may include formed metal, molded plastic, wood or combinations of these and/or other materials. The riser 614 may include straight, curved or otherwise shaped side walls 626. The side walls 626 form a space 616 between the planter walls 612 and/or the bottom 622. Space 616 is sealed using the walls 626, walls 612 and/or the bottom 622 in some embodiments to trap water therein (e.g., functions as a reservoir). The riser 614 reduces the internal space 620 (volume) of the planter 610. In this way, less soil or other media is needed to fill the planter 610. In addition, the space 616 is narrowed so that when the plant in the planter 610 is watered, the water level in the planter rises faster with less water due to the reduced volume (e.g., due to the inverted space distribution of the space 616). In other embodiments, the riser 614 may include an insert, which can be placed within an existing planter.

In accordance with the present principles, planter 610 preserves water over conventional planters. Water preservation is achieved in a plurality of ways. One way includes catching water in the reservoir 618 so that the water is available at the roots of the plant. Another way includes reducing the space 616 to cause the water level to rise higher with less water so that the water is available closer to the root system of the plant. In conventional planters, water is wasted by dropping to the bottom of the planter and/or draining out of the bottom of the planter. In order to keep the soil moist, a much larger volume of water is needed. In accordance with the present principles, the shape and limited volume of the spacer 616 between the walls 612 of the planters and the walls 626 of the riser 614 store water therein and provide water to a higher position in the planter 610 with less water needed due to the restricted shape of the space 616.

In accordance with one embodiment, riser 614 may optionally include weep holes 628 along its surfaces 626 to limit the water height. The reservoir 618 may also optionally include weep holes 628 in its sidewalls (or in its bottom) to limit the water height. The planter 610 may include weep holes 628 through the bottom surface 622 or through lateral walls 612 at a height to limit water collection above the weep holes. The bottom surface weep holes can communicate with the weep holes 628. The riser 614 may be hollow, solid or a combination thereof.

Watering the planter 610 needs less water than conventional planters. The amount of water is reduced and the water used to moisten the soil is more efficiently employed. The water savings is greatly enhanced and amplified when considering a large number of planters.

In some embodiments, the reservoir or the top portion of the riser is pitched to control water flow and to control the location of stored water. In one embodiment, the space 616 can be asymmetrical or include additional reservoirs (within the space 616) to permit water added to the planter to be distributed unevenly.

Figure 10B:
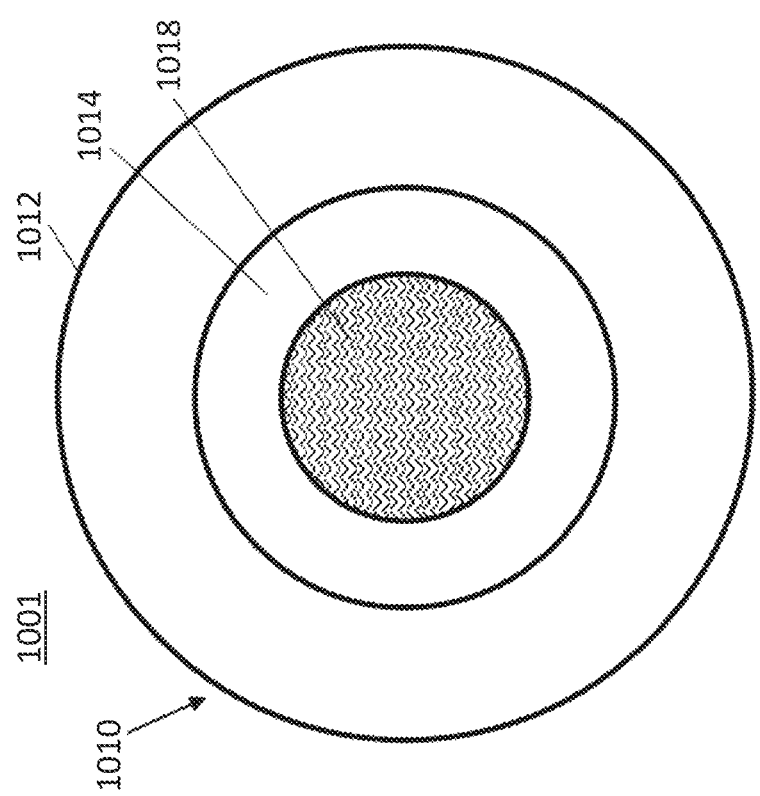
FIG. 10B is a top view of the planter of FIG. 10A showing a recess in a riser for receiving a plate with a riser interface protrusion for supporting soil and/or a plant, in accordance with one embodiment of the present invention.
Figure 10A:
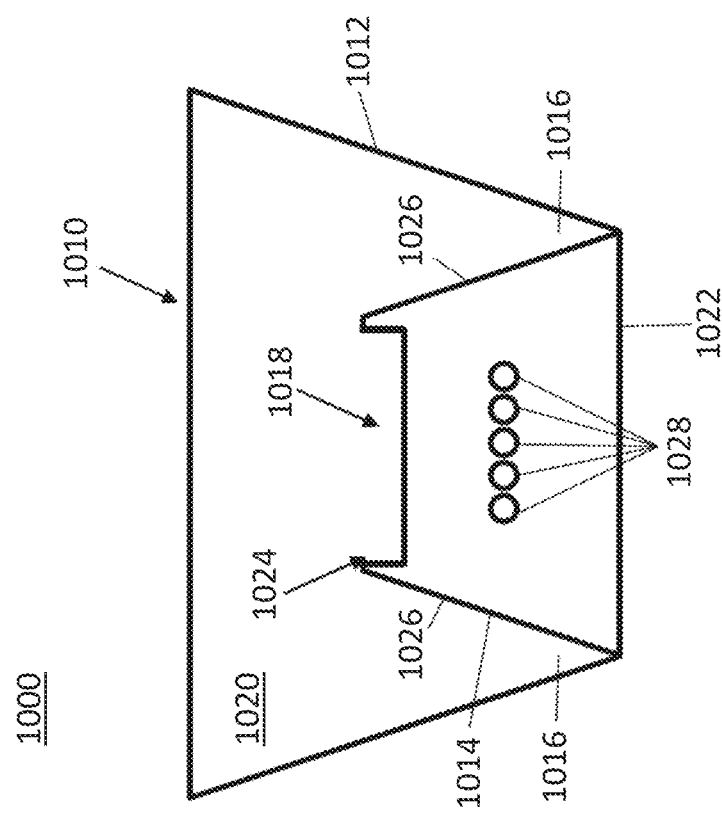
FIG. 10A is a cross-sectional view of a planter having a riser with a recess for receiving a plate with a riser interface protrusion for supporting soil and/or a plant, in accordance with one embodiment of the present invention.
Figure 11B:
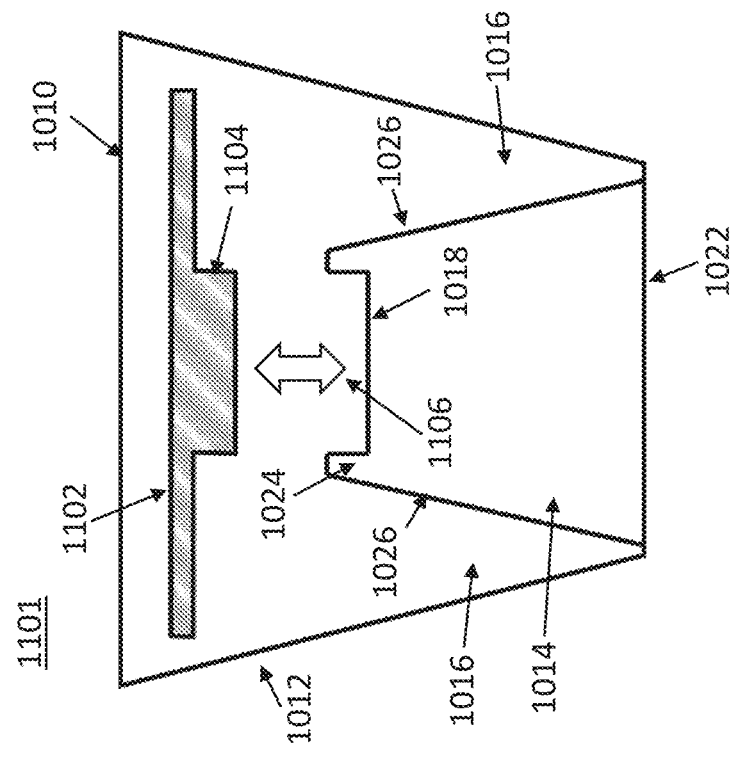
FIG. 11B is a partial cross-sectional view of a planter having a riser with a recess for receiving a plate with a riser interface protrusion and the plate with the riser interface protrusion for supporting soil and/or a plant in a separated state, in accordance with one embodiment of the present invention.
Figure 11A:
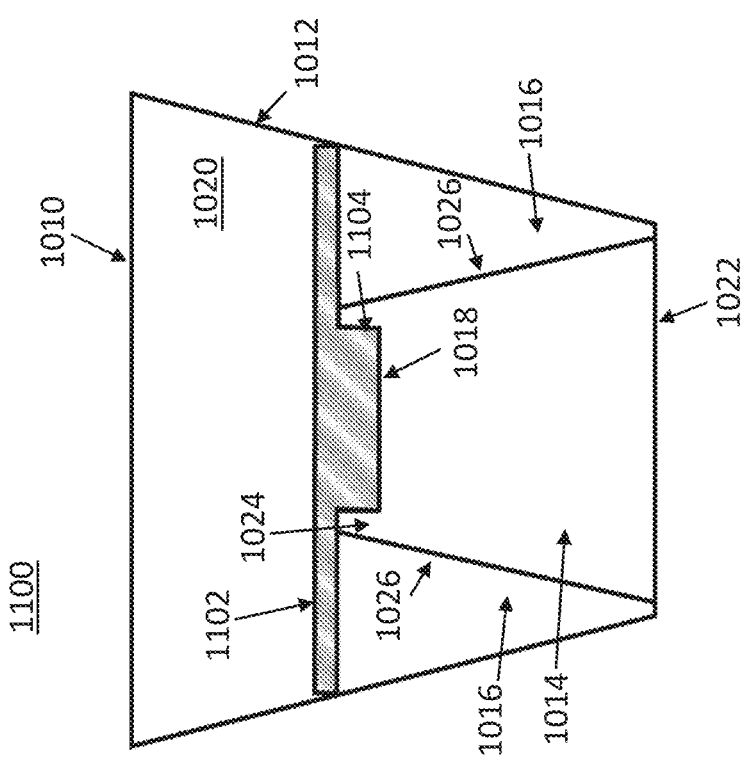
FIG. 11A is a partial cross-sectional view of a planter having a riser with a recess for receiving a plate with a riser interface protrusion and the plate with the riser interface protrusion for supporting soil and/or a plant in an assembled state, in accordance with one embodiment of the present invention.

Referring now to FIG. 10A, a cross-sectional view 1000 of a planter 1010 having a riser 1014 with a recess 1018 for receiving a plate with a riser interface protrusion (described in further detail with regard to elements 1102 and 1104 of FIG. 11A) for supporting soil and/or a plant is illustratively depicted in accordance with one embodiment of the present invention. The planter 1010 may include a flowerpot or other ornamental container. The planter 1010 is illustratively shown having a particular shape; however, it should be understood that the planter 1010 may include any shape and may be scaled to any size. The planter 1010 includes an external wall 1012 that defines an interior space 1020. Within the interior space 1020, a riser 1014 is coupled to a bottom 1022 of the planter 1010. The riser 1014 may be connected to the bottom 1022, be connected to the wall 1012 or a combination of both. The riser 1014 may be solid or hollow and connected to the bottom 1022 or function as the bottom or the planter (e.g., integrally formed with the planter). The riser 1014 may include holes in sides thereof as needed.

The riser 1014 provides an elevated portion or top portion 1024, which can be configured to receive a plant or plants, another planter, a plate or platform with a riser interface protrusion, or another object according to various embodiments of the present invention. The top portion 1024 can include a recess portion 1018 configured to receive a riser interface protrusion (described in further detail with reference to element 1104 of FIG. 11A) extending from a bottom of a plate or platform with a riser interface protrusion 1104. The recess portion 1018 can also include a pitched bottom and may have weep holes (not shown) formed through side walls and/or bottom walls of the recess portion 1018. In use, the recess portion 1018 may be filled with a plate with a riser interface protrusion 1104 or a platform formed with sunken sidewalls and a riser interface protrusion (described in further detail with reference to element 1504 of FIG. 15A) configured to fit within the recess 1018 in accordance with embodiments of the present invention. It is to be appreciated that although the recess 1018 is illustratively depicted as including a particular shape and size, the recess can be any shape and can be scaled to any size in accordance with embodiments of the present invention. In some embodiments, a plurality of individual risers 1014 including one or more recesses 1018 for receiving the riser interface protrusion 1104 can be installed (or integrally formed) in the planter 1010 in accordance with various embodiments of the present invention. Further, the riser 1014 can include multiple recesses 1018 and/or the plate (described in further detail with reference to element 1102 of FIG. 12A) can include multiple riser interface protrusions (not shown) configured to be coupled with the plurality of individual risers 1014 in accordance with embodiments of the present invention.

In some embodiments, the riser 1014 may be integrally formed with the other portions of the planter 1010. The planter 1010 may include formed metal, molded plastic, wood, or combinations of these and/or other materials. The riser 1014 may include straight, curved or otherwise shaped side walls 1026. The side walls 1026 form a space 1016 between the planter walls 1012 and/or the bottom 1022. Space 1016 is sealed using the walls 1026, walls 1012 and/or the bottom 1022 in some embodiments to trap water therein. The riser 1014 reduces the internal space 1020 (volume) of the planter 1010. In this way, less soil or other media is needed to fill the planter 1010. In addition, the space 1016 can be filled with weighting materials (e.g., rocks, weights, sand, etc.) to add further stability to the planter 1010. In other embodiments, the riser 1014 may be an insert, which can be placed within an existing planter.

In accordance with one embodiment, a riser 1014 may optionally include weep holes 1028 along its surfaces 1026 to limit the water height. The recess 1018 may also optionally include weep holes (not shown) in its sidewalls (or in its bottom) to drain water to prevent pooling. The planter 1010 may include weep holes (not shown) through the bottom surface 1022 or through lateral walls 1012 at a height to limit water collection above the weep holes. The bottom surface weep holes can communicate with the weep holes 1028. The riser 1014 may be hollow, solid or a combination thereof in accordance with various embodiments of the present invention.

It is to be appreciated that part or all of the elements described herein with reference to FIG. 10A can be interchanged with similar elements from FIGS. 10B-17B, and at least portions of the systems of claims 10A-17B can be utilized and/or connected to similar portions using different elements from FIGS. 10A-17B, in accordance with various embodiments of the present invention.

Referring now to FIG. 10B, a top view 1001 of the planter 1010 of FIG. 10A showing a recess 1018 in a riser 1014 for receiving a plate or platform with a riser interface protrusion (not shown) for supporting soil and/or a plant is illustratively depicted in accordance with one embodiment of the present invention. The recess 1018 is depicted as a circular shape in this illustrative embodiment. However, any suitable shape may be employed (e.g., square, rectangle, triangle, hexagon, etc.) in accordance with various embodiments of the present invention. In addition, the riser 1014 is depicted as a conical shape in FIG. 10A, but any suitable shape may be employed (e.g., cylindrical shape, a rectangular shape, multiple columns, etc.) in accordance with various embodiments of the present invention. The planter 1010 is also depicted as a circular conical shape in this illustrative embodiment. However, any suitable shape may also be employed (e.g., square, rectangle, triangle, hexagon, etc.) in accordance with embodiments of the present invention.

Referring now to FIG. 11A, a partial cross-sectional view 1100 of a planter 1010 having a riser 1014 with a recess 1018 for receiving a plate 1102 with a riser interface protrusion 1104 which is configured to operatively couple as a locating and securing protrusion with the recess of the riser, in an assembled state with the plate 1102 with the riser interface protrusion 1104 for supporting soil and/or a plant is illustratively depicted in accordance with one embodiment of the present invention. The riser interface protrusion 1104 can extend downward from the top surface of the plate 1102 and the top surface of the riser interface protrusion 1104 may be flat, pitched, and/or may form an open-top indented reservoir cavity (described in further detail with reference to element 1212 of FIG. 12A). The reservoir portion 1212 formed by the recess 1018 in the riser can collect and store water, as described above with reference to element 18 of FIG. 1, in accordance with embodiments of the present invention. In some embodiments, the riser interface protrusion 1104 can be solid with a substantially planar support surface without a reservoir portion 1212, according to aspects of the present invention.

The planter 1010 may include a flowerpot or other ornamental container. The planter 1010 is illustratively shown having a particular shape; however, it should be understood that the planter 1010 may include any shape and may be scaled to any size. The planter 1010 includes an external wall 1012 that defines an interior space 1020. Within the interior space 1020, a riser 1014 is coupled to a bottom 1022 of the planter 1010. The riser 1014 may be connected to the bottom 1022, be connected to the wall 1012 or any combination of both. The riser 1014 may be solid or hollow and connected to the bottom 1022 or function as the bottom or the planter (e.g., integrally formed with the planter). The riser 1014 may include holes in sides thereof as needed.

The riser 1014 provides an elevated portion or top portion 1024 for increased air and/or water flow, and the riser 1014 can be configured to receive a plant or plants, another planter, a plate or platform with a riser interface protrusion 1104, or another object according to various embodiments of the present invention. The top portion 1024 can include a recess portion 1018 configured to receive a plate 1102 with a riser interface protrusion 1104. The recess portion 1018 can also include a pitched bottom and may have weep holes (not shown) formed through side walls and/or bottom walls of the recess portion 1018. In use, the recess portion 1018 may receive a plate 1102 with a riser interface protrusion 1104 sized to fit within the recess 1018 in accordance with embodiments of the present invention. The fit can include a contact fit, a snap fit, a securing fit (e.g., using a securing mechanism such as threads, bayonet, or other mechanical structures). It is to be appreciated that although the recess 1018 is illustratively depicted as including a particular shape and size, the recess 1018 can be any shape and can be scaled to any size in accordance with embodiments of the present invention.

In some embodiments, the riser interference protrusion 1104 can be configured to fill the recess 1018 or may include a plurality of riser interface protrusions 1104 to locate the plate 1102 within the recess 1018. For example, in one embodiment, the protrusion 1104 can include a series of protrusions, pillars, detents, etc. that locate the plate 1102 in the recess 1018. In some embodiments, the protrusion 1104 can include a series of protrusions, pillars, detents, etc. which can be disposed such that the protrusions are positioned to abut the interior edges of the recess 1018. In this way, the size and weight of the plate 1102 can be reduced in accordance with aspects of the present invention.

In some embodiments, the riser 1014 may be integrally formed with the other portions of the planter 1010. The planter 1010 may include formed metal, plastic, wood, or combinations of these and/or other materials. The riser 1014 may include straight, curved or otherwise shaped side walls 1026. The side walls 1026 form a space 1016 between the planter walls 1012 and/or the bottom 1022. Space 1016 is sealed using the walls 1026, walls 1012 and/or the bottom 1022 in some embodiments to trap water therein. The riser 1014 reduces the internal space 1020 (volume) of the planter 1010. In this way, less soil or other media is needed to fill the planter 1010. In addition, the space 1016 can be filled with weighting materials (e.g., rocks, weights, sand, etc.) to add further stability to the planter 1010. In other embodiments, the riser 1014 may be an insert, which can be placed within an existing planter.

In accordance with embodiments of the present invention, the plate 1102 when assembled forms an upper space 1020 in the planter 1010 such that an amount of soil needed to fill the planter 1010 and an amount of water needed for the plant is minimized. The space 1016 is blocked from above by the plate 1102, and thus only the upper space 1020 is filled with soil and/or a plant in an embodiment of the present invention. It is to be appreciated that although the recess 1018, the plate 1102, and the protrusion 1104 are illustratively depicted as including a particular shape and size, the recess, 1018, the plate 1102, and the protrusion 1104 can be any shape and can be scaled to any appropriate size such that the protrusion 1104 can fit within the recess 1018 in accordance with embodiments of the present invention. The fit can include a contact fit, a snap fit, a securing fit (e.g., using a securing mechanism such as threads, bayonet, or other mechanical structures). It is to be appreciated that although the recess 1018 is illustratively depicted as including a particular shape and size, the recess 1018 can be any shape and can be scaled to any size in accordance with embodiments of the present invention.

Referring now to FIG. 11B, a partial cross-sectional view 1101 of a planter 1010 having a riser 1014 with a recess 1018 for receiving a plate 1102 with a riser interface protrusion 1104 and the plate 1102 with the riser interface protrusion 1104 in an assembled state for supporting soil and/or a plant is illustratively depicted in accordance with one embodiment of the present invention. The riser interface protrusion 1104 can extend downward from the top surface of the plate 1102 and the top surface of the riser interface protrusion 1104 may be flat, pitched, and/or may form an indented reservoir portion configured to collect and store water similarly to the reservoir described with reference to element 18 of FIG. 1, in accordance with embodiments of the present invention.

The planter 1010 may include a flowerpot or other ornamental container. The planter 1010 is illustratively shown having a particular shape; however, it should be understood that the planter 1010 may include any shape and may be scaled to any size. The planter 1010 includes an external wall 1012 that defines an interior space 1020. Within the interior space 1020, a riser 1014 is coupled to a bottom 1022 of the planter 1010. The riser 1014 may be connected to the bottom 1022, be connected to the wall 1012 or any combination of both. The riser 1014 may be solid or hollow and connected to the bottom 1022 or function as the bottom or the planter (e.g., integrally formed with the planter). The riser 1014 may include holes in sides thereof as needed.

The riser 1014 provides an elevated portion or top portion 1024, which can be configured to receive a plant or plants, another planter, a plate or platform with a riser interface protrusion, or another object according to various embodiments of the present invention. The top portion 1024 can include a recess portion 1018 configured to receive a plate 1102 with a riser interface protrusion. The recess portion 1018 can also include a pitched bottom and may have weep holes (not shown) formed through side walls and/or bottom walls of the recess portion 1018. In use, the recess portion 1018 may receive a plate with a riser interface protrusion sized to fit within the recess 1018 in accordance with embodiments of the present invention. It is to be appreciated that although the recess 1018 is illustratively depicted as including a particular shape and size, the recess can be any shape and can be scaled to any size in accordance with embodiments of the present invention.

In some embodiments, the riser 1014 may be integrally formed with the other portions of the planter 1010. The planter 1010 may include formed metal, molded plastic, wood, or combinations of these and/or other materials. The riser 1014 may include straight, curved or otherwise shaped side walls 1026. The side walls 1026 form a space 1016 between the planter walls 1012 and/or the bottom 1022. Space 1016 is sealed using the walls 1026, walls 1012 and/or the bottom 1022 in some embodiments to trap water therein. The riser 1014 reduces the internal space 1020 (volume) of the planter 1010. In this way, less soil or other media is needed to fill the planter 1010. In addition, the space 1016 can be filled with weighting materials (e.g., rocks, weights, sand, etc.) to add further stability to the planter 1010. In other embodiments, the riser 1014 may be an insert, which can be placed within an existing planter.

In accordance with embodiments of the present invention, the plate 1102 can be lowered 1106 onto the riser 1014 such that the protrusion 1104 is coupled with the recess 1018 and forms an upper space 1020 in the planter 1010 such that an amount of soil needed to fill the planter 1010 and an amount of water needed for the plant is minimized. The space 1016 is blocked from above by the plate 1102, and thus only the upper space 1020 is filled with soil and/or a plant in an embodiment of the present invention. It is to be appreciated that although the recess 1018, the plate 1102, and the protrusion 1104 are illustratively depicted as including a particular shape and size, the recess, 1018, the plate 1102, and the protrusion 1104 can be any shape and can be scaled to any appropriate size such that the protrusion 1104 can fit within the recess 1018 in accordance with embodiments of the present invention. The fit can include a contact fit, a snap fit, a securing fit (e.g., using a securing mechanism such as threads, bayonet, or other mechanical structures). It is to be appreciated that although the recess 1018 is illustratively depicted as including a particular shape and size, the recess 1018 can be any shape and can be scaled to any size in accordance with embodiments of the present invention.

Figure 12A:
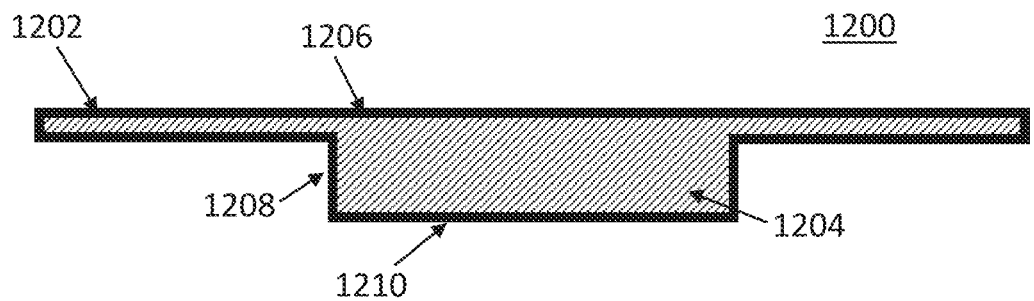
FIG. 12A is a side view of a plate with drainage holes and a riser interface protrusion for coupling with a recess in a top surface of the riser, in accordance with one embodiment of the present invention.

Referring now to FIG. 12A, with continued reference to FIG. 11A, a cross-sectional view 1200 of a plate 1202 with drainage holes (not shown) in a top support surface 1206, and a riser interface protrusion 1204 for coupling with a recess 1018 in a top surface of a riser 1014 with a recess 1018 for receiving the plate 1202 with the riser interface protrusion 1204, is illustratively depicted in accordance with one embodiment of the present invention. The plate 1202 can be formed from any appropriate materials, including, for example, rubber, plastic, formed metal, molded plastic, wood, or combinations of these and/or other materials, and is configured to support soil and/or a plant on a top surface 1206 when coupled with the recess 1018 of a riser 1014 in accordance with embodiments of the present invention.

The riser interface protrusion 1204 can extend downward from the top surface 1206 of the plate 1202 and the top surface of the riser interface protrusion 1204 may be flat, pitched, and/or may form an indented reservoir portion configured to collect and store water similarly to the reservoir described with reference to element 18 of FIG. 1, in accordance with embodiments of the present invention. It is to be appreciated that although the plate 1202 and the protrusion 1204 are illustratively depicted as including a particular shape and size, the plate 1202 and the protrusion 1204 can be any shape (e.g., square, circle, octagon, hexagon, etc.) and can be scaled to any appropriate size such that the protrusion 1204 can fit within the recess 1018 and the plate 1202 can fit within the planter 1010 in accordance with embodiments of the present invention. The fit can include a contact fit, a snap fit, a securing fit (e.g., using a securing mechanism such as threads, bayonet, or other mechanical structures). It is to be appreciated that although the recess 1018 is illustratively depicted as including a particular shape and size, the recess 1018 can be any shape and can be scaled to any size in accordance with embodiments of the present invention.

Figure 12B:
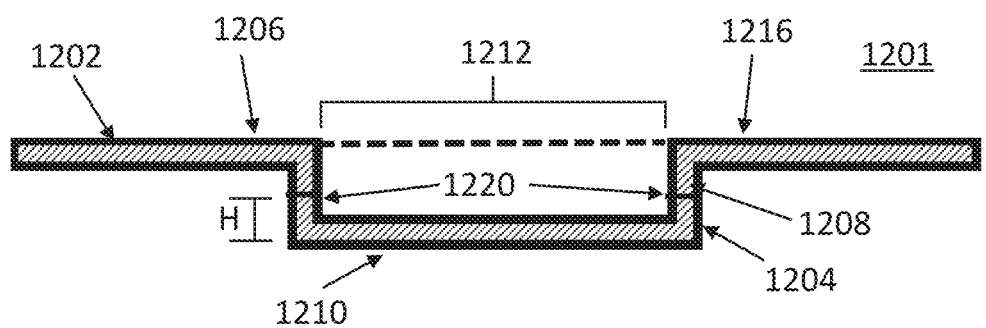
FIG. 12B is a cross-sectional view of a plate with drainage holes and a riser interface protrusion for coupling with a recess in a top surface of the riser, in accordance with one embodiment of the present invention

Referring now to FIG. 12B, with continued reference to FIG. 11A, a partial cross-sectional view of a plate 1202 with drainage holes (not shown) and a riser interface protrusion 1204 for coupling with a recess 1018 in a top surface of the riser 1014, is illustratively depicted in accordance with one embodiment of the present invention.

In some embodiments, the protrusion 1204 can extend downward from the top surface 1206 of the plate 1202. An interior surface of the riser interface protrusion 1204 can be formed by sidewalls 1208 and a bottom support surface 1210 of the riser interface protrusion 1204. The riser interface protrusion 1204 may be flat, pitched, and/or may form an indented reservoir portion 1212 configured to collect and store water similarly to the reservoir described with reference to element 18 of FIG. 1, in accordance with embodiments of the present invention. The reservoir 1212 formed in protrusion 1204 is configured to receive and store water for plant hydration. The reservoir 1212 may be water-tight or may be permeable or semi-permeable. In some embodiments, the permeable and semi-permeable embodiments may permit water to collected up to a predetermined height (H) above a water-tight lower portion 1220. Weep holes (described in further detail with reference to element 1222 of FIG. 12C) can be formed in the sidewalls 1208 to provide drainage to prevent a water level from rising over the predetermined height (H) on the sidewalls 1208. In some embodiments the bottom surface 1210 can include weep holes 1222 to provide drainage for the lower portion 1220 in accordance with aspects of the present invention. It is to be appreciated that the weep holes 1222 can be formed at any selected height and/or shape in the sidewalls 1208 and/or bottom surface 1210 of the protrusion 1204 in accordance with embodiments of the present invention.

The protrusion 1204 includes a bottom surface 1210 that can completely or partially interface with the recess 1018 of the riser 1014. In one embodiment, the bottom surface 1210 of the protrusion 1204 contacts a bottom surface of the recess 1018. In other embodiments, a gap exists between the bottom surface 1210 of the protrusion 1204 and the bottom surface of the recess 1018. The walls 1208 of the riser interface protrusion 1204 can engage side walls of the recess 1018 of the riser 1014. The walls of the recess 1018 may have a slight interference fit to hold the plate 1202 in place. In other embodiments, the engagement between the recess 1018 and the walls 1208 of the riser interface protrusion 1204 can have some clearance and not be in direct contact with each other. In still other embodiments, the engagement between the reservoir and the walls of the bottom surface can be secured to one another using a mechanical structure (e.g., threaded engagement, bayonet engagement, fastening mechanism, hook and loop, adhesive or other structure). It is to be appreciated that although the plate 1202 and the protrusion 1204 are illustratively depicted as including a particular shape and size, the plate 1202 and the protrusion 1204 can be any shape (e.g., square, circle, octagon, hexagon, etc.) and can be scaled to any appropriate size such that the protrusion 1204 can fit within the recess 1018 and the plate 1202 can fit within the planter 1010 in accordance with embodiments of the present invention.

Figure 12C:
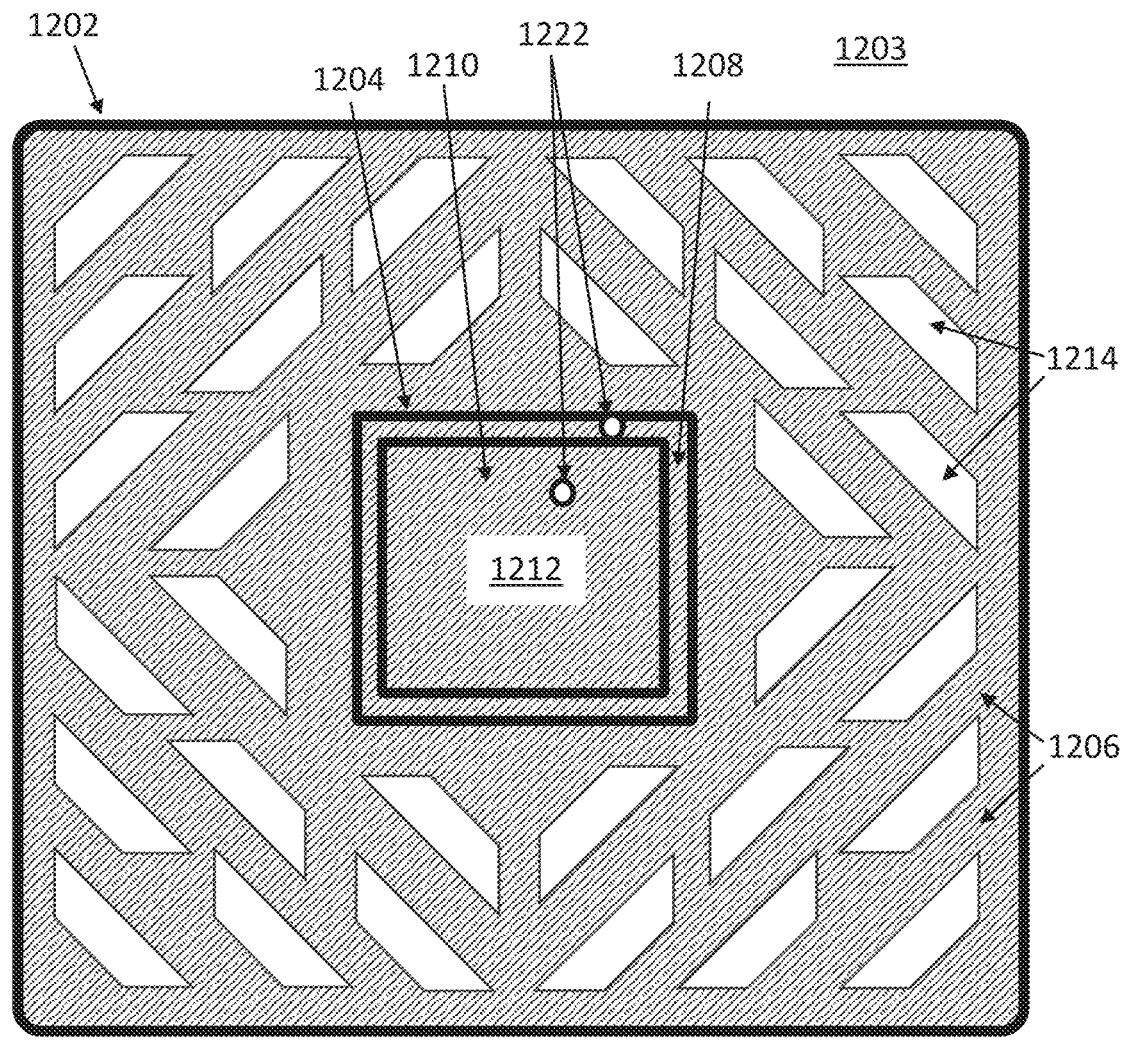
FIG. 12C is a top plan view of a plate with drainage holes and a riser interface protrusion for coupling with a recess in a top surface of the riser, in accordance with one embodiment of the present invention.

Referring now to FIG. 12C, with continued reference to FIG. 11A, atop plan view 1201 of a plate 1202 with drainage holes 1214 in a top support surface 1206 and a riser interface protrusion 1204 for coupling with a riser 1014 with a recess 1018 for receiving a plate 1202 with a riser interface protrusion 1204 is illustratively depicted in accordance with one embodiment of the present invention. The plate 1202 can be formed from any appropriate materials, including, for example, rubber, plastic, formed metal, molded plastic, wood, or combinations of these and/or other materials, and is configured to support soil and a plant on a top surface 1206 when coupled with the recess 1018 of a riser 1014 in accordance with embodiments of the present invention.

The riser interface protrusion 1204 can extend downward from the top surface 1206 of the plate 1202 and the top surface of the riser interface protrusion 1204 may be flat, pitched, and/or may form an indented reservoir portion 1212 configured to collect and store water similarly to the reservoir described with reference to element 18 of FIG. 1, in accordance with embodiments of the present invention. The protrusion 1204 includes a bottom surface 1210 that can completely or partially interface with the recess 1018 of the riser 1014. In one embodiment, the bottom surface 1210 of the protrusion 1204 contacts a bottom surface of the recess 1018. In other embodiments, a gap exists between the bottom surface 1210 of the protrusion 1204 and the bottom surface of the recess 1018. The walls 1208 of the recess interface protrusion 1504 can engage side walls of the recess 1018 of the riser 1014. The walls of the recess 1018 may have a slight interference fit to hold the plate 1202 in place.

In other embodiments, the engagement between the recess 1018 and the walls 1208 of the riser interface protrusion 1204 can have some clearance and not be in direct contact with each other. In still other embodiments, the engagement between the reservoir and the walls of the bottom surface can be secured to one another using a mechanical structure (e.g., threaded engagement, bayonet engagement, fastening mechanism, hook and loop, adhesive or other structure). It is to be appreciated that although the plate 1202 and the protrusion 1204 are illustratively depicted as including a particular shape and size, the plate 1202 and the protrusion 1204 can be any shape (e.g., square, circle, octagon, hexagon, etc.) and can be scaled to any appropriate size such that the protrusion 1204 can fit within the recess 1018 and the plate 1202 can fit within the planter 1010 in accordance with embodiments of the present invention.

In some embodiments, weep holes 1222 can be formed in the sidewalls 1208 to provide drainage to prevent a water level from rising over the predetermined height (H) on the sidewalls 1208. In some embodiments the bottom surface 1210 can include weep holes 1222 to provide drainage for the lower portion 1220 in accordance with aspects of the present invention. It is to be appreciated that the weep holes 1222 can be formed at any selected height and/or shape in the sidewalls 1208 and/or bottom surface 1210 of the protrusion 1204 in accordance with embodiments of the present invention.

It is to be appreciated that although the plate 1202, the protrusion 1204, and the drainage holes 1214 are illustratively depicted as including a particular shape and size, the plate 1202 and the protrusion 1204 can be any shape (e.g., square, circle, octagon, hexagon, etc.) and can be scaled to any appropriate size such that the protrusion 1204 can fit within the recess 1018 and the plate 1202 can fit within the planter 1010 in accordance with embodiments of the present invention. The fit can include a contact fit, a snap fit, a securing fit (e.g., using a securing mechanism such as threads, bayonet, or other mechanical structures). It is to be appreciated that although the recess 1018 is illustratively depicted as including a particular shape and size, the recess 1018 can be any shape and can be scaled to any size in accordance with embodiments of the present invention.

Figure 13A:
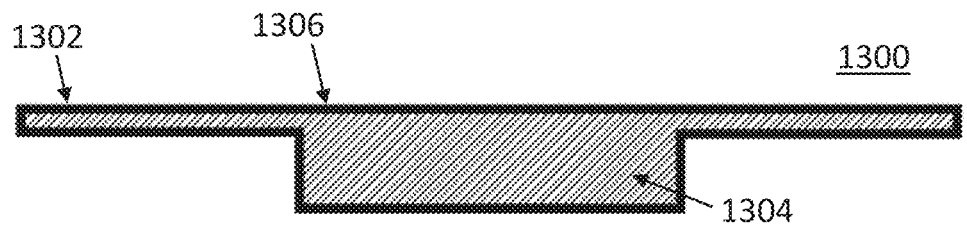
FIG. 13A is a side view of a plate with a solid support surface and a riser interface protrusion for coupling with a recess in a top surface of the riser, in accordance with one embodiment of the present invention.

Referring now to FIG. 13A, with continued reference to FIG. 11A, a cross-sectional view 1300 of a plate 1302 with a solid and substantially planar top support surface 1306 and a riser interface protrusion 1304 for coupling with a riser 1014 with a recess 1018 for receiving the plate 1302 with the riser interface protrusion 1304 is illustratively depicted in accordance with one embodiment of the present invention. The plate 1302 can be formed from any appropriate materials, including, for example rubber, plastic, formed metal, molded plastic, wood, or combinations of these and/or other materials, and is configured to support soil and a plant on the top support surface 1306 when coupled with the recess 1018 of a riser 1014 in accordance with embodiments of the present invention.

The riser interface protrusion 1304 can extend downward from the top surface 1306 of the plate 1302 and the top surface of the riser interface protrusion 1304 may be flat, pitched, and/or may form an indented reservoir portion configured to collect and store water similarly to the reservoir described with reference to element 18 of FIG. 1, in accordance with embodiments of the present invention. It is to be appreciated that although the plate 1302 and the protrusion 1304 are illustratively depicted as including a particular shape and size, the plate 1302 and the protrusion 1304 can be any shape (e.g., square, circle, octagon, hexagon, etc.) and can be scaled to any appropriate size such that the protrusion 1304 can fit within the recess 1018 and the plate 1302 can fit within the planter 1010 in accordance with embodiments of the present invention. The fit can include a contact fit, a snap fit, a securing fit (e.g., using a securing mechanism such as threads, bayonet, or other mechanical structures). It is to be appreciated that although the recess 1018 is illustratively depicted as including a particular shape and size, the recess 1018 can be any shape and can be scaled to any size in accordance with embodiments of the present invention.

Figure 13B:
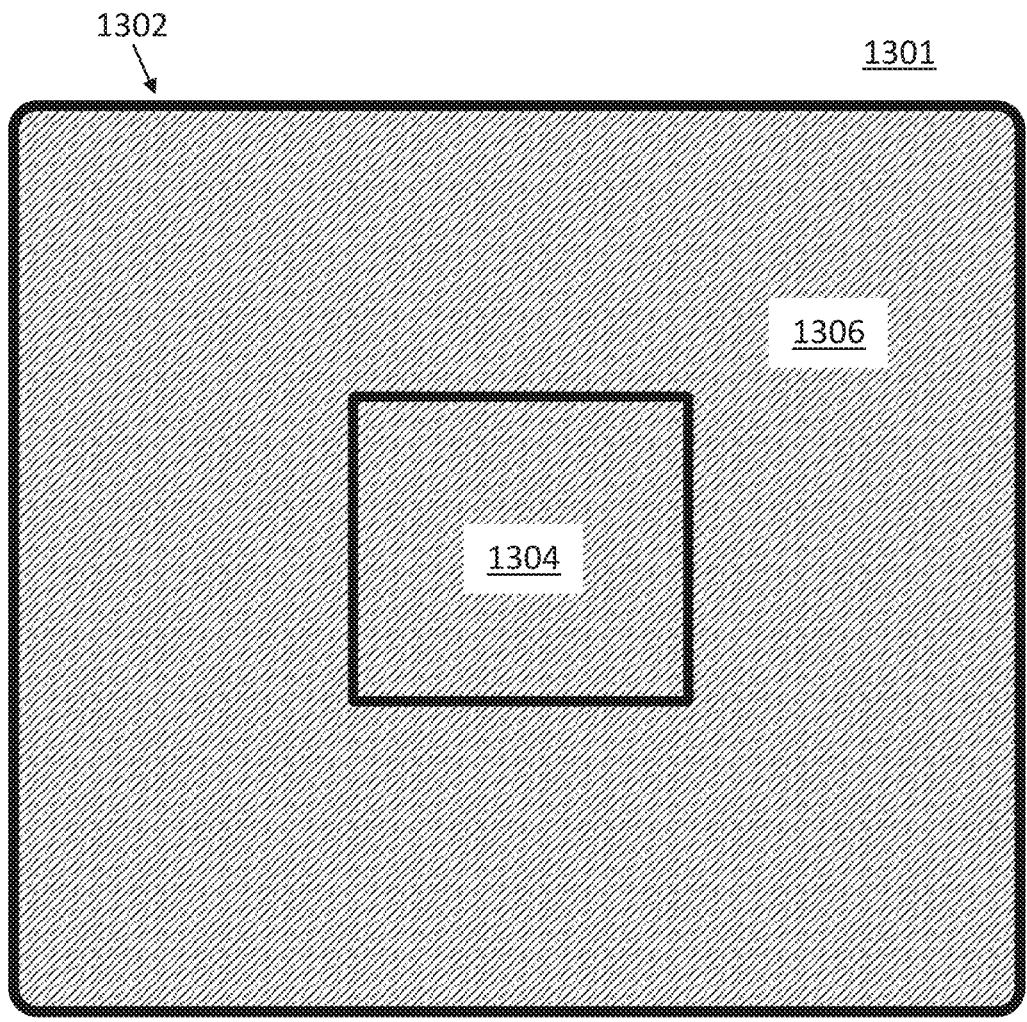
FIG. 13B is a top plan view of a plate with a solid support surface and a riser interface protrusion for coupling with a recess in a top surface of the riser, in accordance with one embodiment of the present invention.

Referring now to FIG. 13B, with continued reference to FIG. 11A, atop plan view 1301 of a plate 1302 with a riser interface protrusion 1304 for coupling with a riser 1014 with a recess 1018 for receiving the plate 1302 is illustratively depicted in accordance with one embodiment of the present invention. The plate 1302 can be formed from any appropriate materials, including, for example, rubber, plastic, formed metal, molded plastic, wood, or combinations of these and/or other materials, and is configured to support soil and a plant on a top surface 1306 when coupled with the recess 1018 of a riser 1014 in accordance with embodiments of the present invention.

The riser interface protrusion 1304 can extend downward from the top surface 1306 of the plate 1302 and the top surface of the riser interface protrusion 1304 may be flat, pitched, and/or may form an indented reservoir portion configured to collect and store water similarly to the reservoir described with reference to element 18 of FIG. 1, in accordance with embodiments of the present invention. It is to be appreciated that although the plate 1302 and the protrusion 1304 are illustratively depicted as including a particular shape and size, the plate 1302 and the protrusion 1304 can be any shape (e.g., square, circle, octagon, hexagon, etc.) and can be scaled to any appropriate size such that the protrusion 1304 can fit within the recess 1018 and the plate 1302 can fit within the planter 1010 in accordance with embodiments of the present invention. The fit can include a contact fit, a snap fit, a securing fit (e.g., using a securing mechanism such as threads, bayonet, or other mechanical structures). It is to be appreciated that although the recess 1018 is illustratively depicted as including a particular shape and size, the recess 1018 can be any shape and can be scaled to any size in accordance with embodiments of the present invention.

Figure 14A:
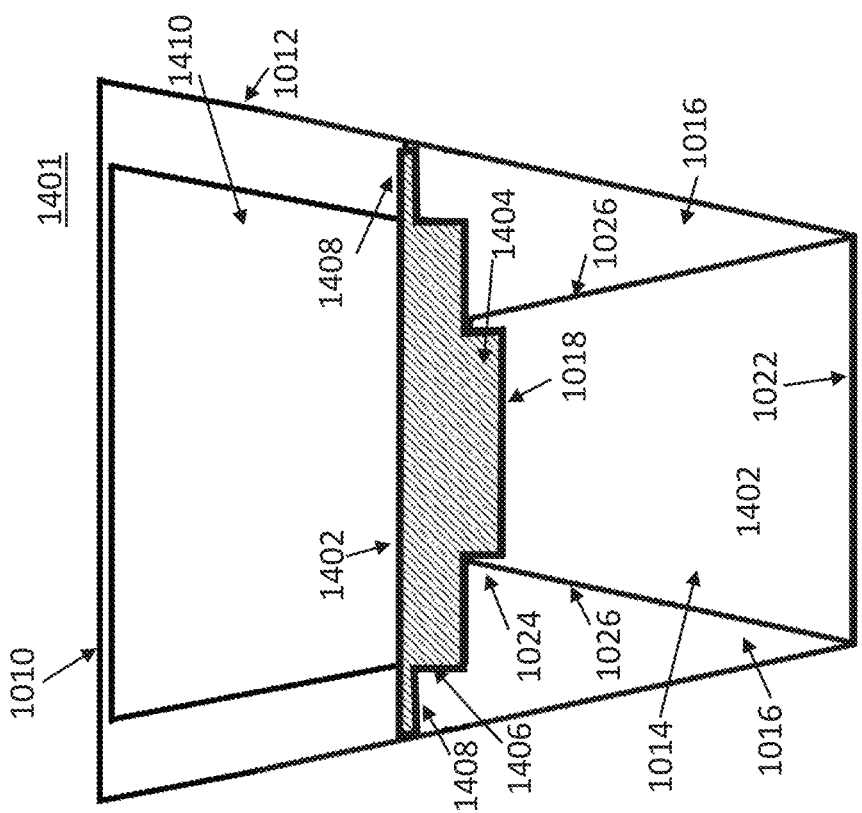
FIG. 14A is a partial cross-sectional view of a planter having a riser with a recess for receiving a basket platform with a riser interface protrusion and sunken platform sidewalls connected to a bottom support surface for receiving and supporting a plant pot, in accordance with one embodiment of the present invention.

Referring now to FIG. 14A, a partial cross-sectional view 1400 of a planter 1010 having a riser 1014 with a recess 1018 for receiving a basket platform 1402 with a riser interface protrusion 1404 and sunken platform sidewalls 1406 connected to a bottom support surface for receiving and supporting a plant pot (described in further detail with reference to element 1516 of FIG. 15A), is illustratively depicted in accordance with one embodiment of the present invention.

The riser interface protrusion 1404 can extend downward from the top surface of the basket platform 1402 and the top surface of the riser interface protrusion 1404 may be flat, pitched, and/or may form an open-top indented reservoir cavity (described in further detail with reference to element 1512 of FIG. 15A). The reservoir portion 1512 formed by the recess 1018 in the riser can collect and store water, as described above with reference to element 18 of FIG. 1, in accordance with embodiments of the present invention. In some embodiments, the riser interface protrusion 1404 can be solid with a substantially planar support surface without a reservoir portion 1512, according to aspects of the present invention.

The planter 1010 may include a flowerpot or other ornamental container. The planter 1010 is illustratively shown having a particular shape; however, it should be understood that the planter 1010 may include any shape and may be scaled to any size. The planter 1010 includes an external wall 1012 that defines an interior space 1020. Within the interior space 1020, a riser 1014 is coupled to a bottom 1022 of the planter 1010. The riser 1014 may be connected to the bottom 1022, be connected to the wall 1012 or a combination of both. The riser 1014 may be solid or hollow and connected to the bottom 1022 or function as the bottom or the planter (e.g., integrally formed with the planter). The riser 1014 may include holes in sides thereof as needed.

The riser 1014 provides an elevated portion or top portion 1024, which can be configured to receive a plant or plants, another planter, a plate or platform with a riser interface protrusion, or another object according to various embodiments of the present invention. The top portion 1024 can include a recess portion 1018 configured to receive a platform 1402 with raised sidewalls 1406 and a riser interface protrusion 1404. The recess portion 1018 can also include a pitched bottom and may have weep holes (not shown) formed through side walls and/or bottom walls of the recess portion 1018. In use, the recess portion 1018 may receive a platform 1402 with a riser interface protrusion 1404 sized to fit within the recess 1018 in accordance with embodiments of the present invention. The fit can include a contact fit, a snap fit, a securing fit (e.g., using a securing mechanism such as threads, bayonet, or other mechanical structures). It is to be appreciated that although the recess 1018 is illustratively depicted as including a particular shape and size, the recess can be any shape and can be scaled to any size in accordance with embodiments of the present invention.

In some embodiments, the riser interference protrusion 1404 can be configured to fill the recess 1018 or may include a plurality of riser interface protrusions 1404 to locate the platform 1402 within the recess 1018. For example, in one embodiment, the protrusion 1404 can include a series of protrusions, pillars, detents, etc. that locate the platform 1402 in the recess 1018. In some embodiments, the protrusion 1404 can include a series of protrusions, pillars, detents, etc. which can be disposed such that the protrusions are positioned to abut the interior walls of the recess 1018. In this way, the size and weight of the platform 1402 can be reduced in accordance with aspects of the present invention.

In some embodiments, the riser 1014 may be integrally formed with the other portions of the planter 1010. The planter 1010 may include formed metal, molded plastic, wood, or combinations of these and/or other materials. The riser 1014 may include straight, curved or otherwise shaped side walls 1026. The side walls 1026 form a space 1016 between the planter walls 1012 and/or the bottom 1022. Space 1016 is sealed using the walls 1026, walls 1012 and/or the bottom 1022 in some embodiments to trap water therein. The riser 1014 reduces the internal space 1020 (volume) of the planter 1010. In this way, less soil or other media is needed to fill the planter 1010. In addition, the space 1016 can be filled with weighting materials (e.g., rocks, weights, sand, etc.) to add further stability to the planter 1010. In other embodiments, the riser 1014 may be an insert, which can be placed within an existing planter.

In accordance with embodiments of the present invention, the platform 1402, when coupled to the recess 1018 by the riser interface protrusion 1018, forms an upper space 1420 in the planter 1010 to accommodate a plant pot (not shown) placed in the basket platform 1402 with sunken sidewalls 1406. The platform 1402 can include a lateral support platform extension 1408 extending outwardly from the top edge of the raised sidewalls 1406 to create an interference fit with the planter walls 1012 when inserted into a planter 1010 in accordance with an embodiment of the present invention.

In various embodiments, the riser interface protrusion 1404 can extend downward from the top surface of the sunken plant pot platform (described in further detail with reference to element 1512 of FIG. 15A), and the top surface of the riser interface protrusion 1404 may be flat, pitched, and/or may form an indented reservoir portion configured to collect and store water similarly to the reservoir described with reference to element 18 of FIG. 1, in accordance with embodiments of the present invention.

The space 1016 is blocked from above by the platform 1402 and the lateral support platform extensions 1408, and thus any weighting materials will be hidden from view in the planter 1010. It is to be appreciated that although the recess 1018, the platform 1402, the riser interface protrusion 1404, the platform sidewalls 1406, and the lateral support platform extension 1408 are illustratively depicted as including a particular shape and size, the recess 1018, the platform 1402, the riser interface protrusion 1404, the platform sidewalls 1406, and the lateral support platform extension 1408 can be any shape and can be scaled to any appropriate size such that the protrusion 1404 can fit within the recess 1018 and the platform 1402 can fit (e.g., loosely or snugly) within the planter 1010 in accordance with embodiments of the present invention. The above-described "fits" can include a contact fit, a snap fit, a securing fit (e.g., using a securing mechanism such as threads, bayonet, or other mechanical structures). It is to be appreciated that although the recess 1018 is illustratively depicted as including a particular shape and size, the recess 1018 can be any shape and can be scaled to any size in accordance with embodiments of the present invention.

Figure 14B:
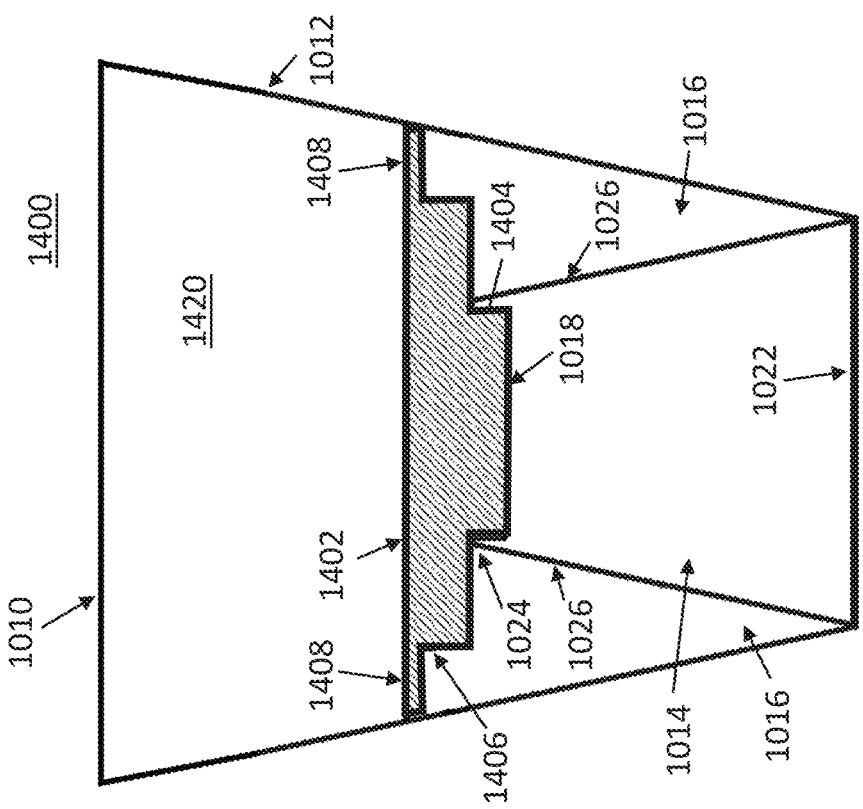
FIG. 14B is a partial cross-sectional view of a planter having a riser with a recess for receiving a basket platform with a riser interface protrusion and sunken platform sidewalls connected to a bottom support surface for receiving and supporting a plant pot with the plant pot in an installed state, in accordance with one embodiment of the present invention.

Referring now to FIG. 14B, a cross-sectional view 1401 of a planter 1010 having a riser 1014 with a recess 1018 for receiving a basket platform 1402 with a riser interface protrusion 1404 and sunken platform sidewalls 1406 connected to a bottom support surface for receiving and supporting a plant pot (described in further detail with reference to element 1516 of FIG. 15A), is illustratively depicted in accordance with one embodiment of the present invention.

The riser interface protrusion 1404 can extend downward from the top surface of the basket platform 1402 and the top surface of the riser interface protrusion 1404 may be flat, pitched, and/or may form an open-top indented reservoir cavity (described in further detail with reference to element 1512 of FIG. 15A). The reservoir portion 1512 formed by the recess 1018 in the riser can collect and store water, as described above with reference to element 18 of FIG. 1, in accordance with embodiments of the present invention. In some embodiments, the riser interface protrusion 1404 can be solid with a substantially planar support surface without a reservoir portion 1512, according to aspects of the present invention.

The planter 1010 may include a flowerpot or other ornamental container. The planter 1010 is illustratively shown having a particular shape; however, it should be understood that the planter 1010 may include any shape and may be scaled to any size. The planter 1010 includes an external wall 1012 that defines an interior space 1020. Within the interior space 1020, a riser 1014 is coupled to a bottom 1022 of the planter 1010. The riser 1014 may be connected to the bottom 1022, be connected to the wall 1012 or a combination of both. The riser 1014 may be solid or hollow and connected to the bottom 1022 or function as the bottom or the planter (e.g., integrally formed with the planter). The riser 1014 may include holes in sides thereof as needed.

The riser 1014 provides an elevated portion or top portion 1024, which can be configured to receive a plant or plants, another planter, a platform 1402 with a riser interface protrusion 1404, or another object according to various embodiments of the present invention. The top portion 1024 can include a recess portion 1018 configured to receive a platform 1402 with raised sidewalls 1406 and a riser interface protrusion 1404. The recess portion 1018 can also include a pitched bottom and may have weep holes (not shown) formed through side walls and/or bottom walls of the recess portion 1018. In use, the recess portion 1018 may receive a basket platform 1402 with a riser interface protrusion 1404 sized to fit within the recess 1018 in accordance with embodiments of the present invention. It is to be appreciated that although the recess 1018 is illustratively depicted as including a particular shape and size, the recess can be any shape and can be scaled to any size in accordance with embodiments of the present invention.

In some embodiments, the riser 1014 may be integrally formed with the other portions of the planter 1010. The planter 1010 may include formed metal, molded plastic, wood, or combinations of these and/or other materials. The riser 1014 may include straight, curved or otherwise shaped side walls 1026. The side walls 1026 form a space 1016 between the planter walls 1012 and/or the bottom 1022. Space 1016 is sealed using the walls 1026, walls 1012 and/or the bottom 1022 in some embodiments to trap water therein. The riser 1014 reduces the internal space 1020 (volume) of the planter 1010. In this way, less soil or other media is needed to fill the planter 1010. In addition, the space 1016 can be filled with weighting materials (e.g., rocks, weights, sand, etc.) to add further stability to the planter 1010. In other embodiments, the riser 1014 may be an insert, which can be placed within an existing planter.

In accordance with embodiments of the present invention, the basket platform 1402, when coupled to the recess 1018 by the riser interface protrusion 1018, forms an upper space 1420 in the planter 1010 to accommodate a plant pot 1410 placed in the platform 1402 with raised sidewalls 1406. The platform 1402 can include a lateral support platform extension 1408 extending outwardly from the top edge of the raised sidewalls 1406 to create an interference fit with the planter walls 1012 when inserted into a planter 1010 in accordance with an embodiment of the present invention.

In various embodiments, the riser interface protrusion 1404 can extend downward from the top surface of the basket platform (described in further detail with reference to element 1512 of FIG. 15A). The top surface of the riser interface protrusion 1404 may be flat, pitched, and/or may form an indented reservoir portion configured to collect and store water similarly to the reservoir described with reference to element 18 of FIG. 1, and is further configured to secure a plant pot 1410 in the basket platform 1512 in accordance with embodiments of the present invention.

The space 1016 is blocked from above by the platform 1402 and the lateral support platform extensions 1408, and thus any weighting materials will be hidden from view in the planter 1010. It is to be appreciated that although the recess 1018, the platform 1402, the riser interface protrusion 1404, the platform sidewalls 1406, and the lateral support platform extension 1408 are illustratively depicted as including a particular shape and size, the recess 1018, the platform 1402, the riser interface protrusion 1404, the platform sidewalls 1406, and the lateral support platform extension 1408 can be any shape and can be scaled to any appropriate size such that the protrusion 1404 can fit within the recess 1018 and the platform 1402 can fit (e.g., loosely or snugly) within the planter 1010 in accordance with embodiments of the present invention. The above-described "fits" can include a contact fit, a snap fit, a securing fit (e.g., using a securing mechanism such as threads, bayonet, or other mechanical structures).

Figure 15A:
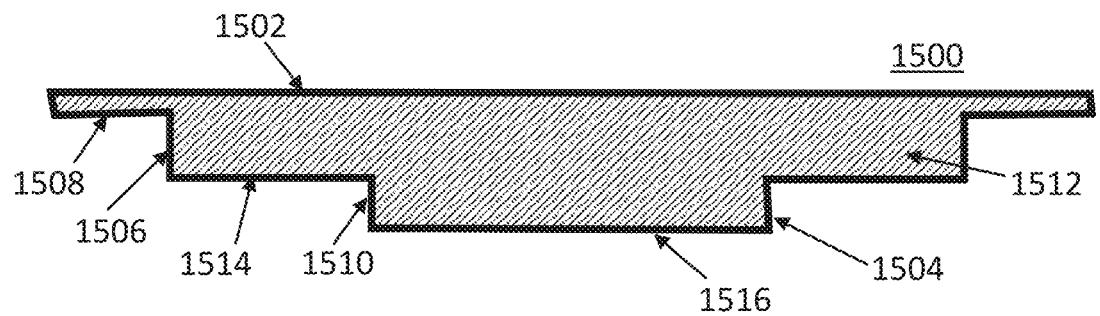
FIG. 15A is a side view of a basket platform with a riser interface protrusion and sunken platform sidewalls connected to a bottom support surface with drain holes for receiving and supporting a plant pot and coupling with a riser with a recess for receiving the basket platform with the riser interface protrusion, in accordance with one embodiment of the present invention.

Referring now to FIG. 15A, with continued reference to FIG. 14A, a cross-sectional view 1500 of a basket platform 1502 with drainage holes (not shown) in a sunken plant pot platform 1512 formed by platform sidewalls 1506 connected to a bottom surface 1516 of the sunken plant pot platform 1512, and a riser interface protrusion 1504 for coupling with a riser 1014 with a recess 1018 for receiving the basket platform 1502 with the riser interface protrusion 1504, is illustratively depicted in accordance with one embodiment of the present invention.

The platform 1502 can be formed from any appropriate materials, including, for example, rubber, plastic, formed metal, molded plastic, wood, or combinations of these and/or other materials, and is configured to support a plant pot (not shown) on a bottom surface 1514 of a sunken plant pot basket platform 1512 formed by raised sidewalls 1506 when the riser interface protrusion 1504 of the platform 1502 is coupled with the recess 1018 of a riser 1014 in accordance with embodiments of the present invention.

In various embodiments, the riser interface protrusion 1504 can extend downward from the top surface of the sunken plant pot platform 1512, and the top surface of the riser interface protrusion 1504 may be flat, pitched, and/or may form an indented reservoir portion configured to collect and store water similarly to the reservoir described with reference to element 18 of FIG. 1, in accordance with embodiments of the present invention. It is to be appreciated that although the platforms 1502, 1512, the lateral support platform extension 1508, and the protrusion 1504 are illustratively depicted as including a particular shape and size, the platforms 1502, 1512, the and the protrusion 1504 can be any shape (e.g., square, circle, octagon, hexagon, etc.) and can be scaled to any appropriate size such that the protrusion 1204 can fit within the recess 1018 and the plate 1202 can fit within the planter 1010 in accordance with embodiments of the present invention. The fit can include a contact fit, a snap fit, a securing fit (e.g., using a securing mechanism such as threads, bayonet, or other mechanical structures). It is to be appreciated that although the recess 1018 is illustratively depicted as including a particular shape and size, the recess 1018 can be any shape and can be scaled to any size in accordance with embodiments of the present invention.

In some embodiments, the riser interface protrusion 1504 can extend downward from the top surface 1514 of the sunken plant pot platform 1512. An interior surface of the riser interface protrusion 1504 can be formed by sidewalls 1510 and a bottom support surface 1516 of the riser interface protrusion 1504. The riser interface protrusion 1504 may be flat, pitched, and/or may form an indented reservoir portion (described in further detail with reference to element 1518 of FIG. 15B) configured to collect and store water similarly to the reservoir described with reference to element 18 of FIG. 1, in accordance with embodiments of the present invention.

It is to be appreciated that although the platform 1502, the protrusion 1504, the raised sidewalls 1506, the lateral support platform extension 1508, and the sunken plant pot platform 1512 are illustratively depicted as including a particular shape and size the platforms 1502, 1512, the protrusion 1504, the raised sidewalls 1506, the lateral support platform extension 1508, and the sunken plant pot platform 1512 can be any shape (e.g., square, circle, octagon, hexagon, etc.) and can be scaled to any appropriate size such that the protrusion 1504 can fit within the recess 1018 and the platform 1502 can fit (e.g., loosely or snugly) within the planter 1010 in accordance with embodiments of the present invention. The above-described "fits" can include a contact fit, a snap fit, a securing fit (e.g., using a securing mechanism such as threads, bayonet, or other mechanical structures) in accordance with embodiments of the present invention.

Figure 15B:
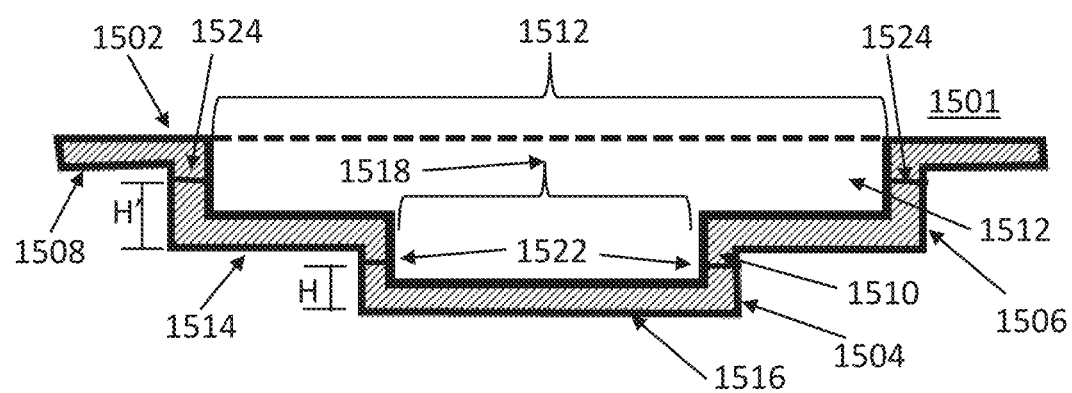
FIG. 15B is a cross-sectional view of a basket platform with a riser interface protrusion and sunken platform sidewalls connected to a bottom support surface with drain holes for receiving and supporting a plant pot and coupling with a riser with a recess for receiving the basket platform with the riser interface protrusion, in accordance with one embodiment of the present invention.

Referring now to FIG. 15B, a partial cross-sectional view of a basket platform 1502 with drainage holes (not shown) in a sunken plant pot platform 1512 formed by sunken platform sidewalls 1506 connected to a bottom surface 1516 of the sunken plant pot platform 1512, and a riser interface protrusion 1504 for coupling with a riser 1014 with a recess 1018 for receiving the basket platform 1502 with the riser interface protrusion 1504, is illustratively depicted in accordance with one embodiment of the present invention.

In some embodiments, the riser interface protrusion 1504 can extend downward from the top surface 1514 of the sunken plant pot platform 1512. An interior surface of the riser interface protrusion 1504 can be formed by sidewalls 1510 and a bottom support surface 1516 of the riser interface protrusion 1504. The riser interface protrusion 1504 may be flat, pitched, and/or may form an indented reservoir portion 1518 configured to collect and store water similarly to the reservoir described with reference to element 18 of FIG. 1, in accordance with embodiments of the present invention. The reservoir 1518 formed in protrusion 1504 is configured to receive and store water for plant hydration. The reservoir 1518 may be water-tight or may be permeable or semi-permeable. In some embodiments, the permeable and semi-permeable embodiments may permit water to collected up to a predetermined height (H) above a water-tight lower portion 1522.

The protrusion 1504 includes a bottom surface 1516 that can completely or partially interface with the recess 1018 of the riser 1014. In one embodiment, the bottom surface 1516 of the protrusion 1504 contacts a bottom surface of the recess 1018. In other embodiments, a gap exists between the bottom surface 1516 of the protrusion 1504 and the bottom surface of the recess 1018. The side walls 1510 of the riser interface protrusion 1504 can engage side walls of the recess 1018 of the riser 1014. The walls of the recess 1018 may have a slight interference fit to hold the plate 1502 in place. In other embodiments, the engagement between the recess 1018 and the walls 1510 of the riser interface protrusion 1504 can have some clearance and not be in direct contact with each other. In still other embodiments, the engagement between the recess 1018 and the sidewalls 1510 and the bottom surface 1516 can be secured to one another using a mechanical structure (e.g., threaded engagement, bayonet engagement, fastening mechanism, hook and loop, adhesive or other structure).

In some embodiments, weep holes (described in further detail with reference to element 1526 of FIG. 15C) can be formed in the sidewalls 1510 of the protrusion 1504 and/or sidewalls of the sunken plant pot platform 1512 to provide drainage to prevent a water level from rising over the predetermined height (H) and/or (H') on the sidewalls 1510, 1506, respectively. In some embodiments the bottom surface 1516 can include weep holes 1526 to provide drainage for the lower portion 1522 of the protrusion 1504 and/or the lower portion 1524 of the sunken plant pot platform 1512 in accordance with aspects of the present invention. It is to be appreciated that the weep holes 1526 can be formed at any selected height and/or shape in the sidewalls 1510, 1506 and/or bottom surface 1516 of the protrusion 1504 and/or bottom surface 1514 of the sunken plant pot platform 1512 in accordance with embodiments of the present invention.

It is to be appreciated that although the platform 1502, the protrusion 1504, the raised sidewalls 1506, the lateral support platform extension 1508, and the sunken plant pot platform 1512 are illustratively depicted as including a particular shape and size the platforms 1502, 1512, the protrusion 1504, the raised sidewalls 1506, the lateral support platform extension 1508, and the sunken plant pot platform 1512 can be any shape (e.g., square, circle, octagon, hexagon, etc.) and can be scaled to any appropriate size such that the protrusion 1504 can fit within the recess 1018 and the platform 1502 can fit (e.g., loosely or snugly) within the planter 1010 in accordance with embodiments of the present invention. The above-described "fits" can include a contact fit, a snap fit, a securing fit (e.g., using a securing mechanism such as threads, bayonet, or other mechanical structures) in accordance with embodiments of the present invention.

Figure 15C:
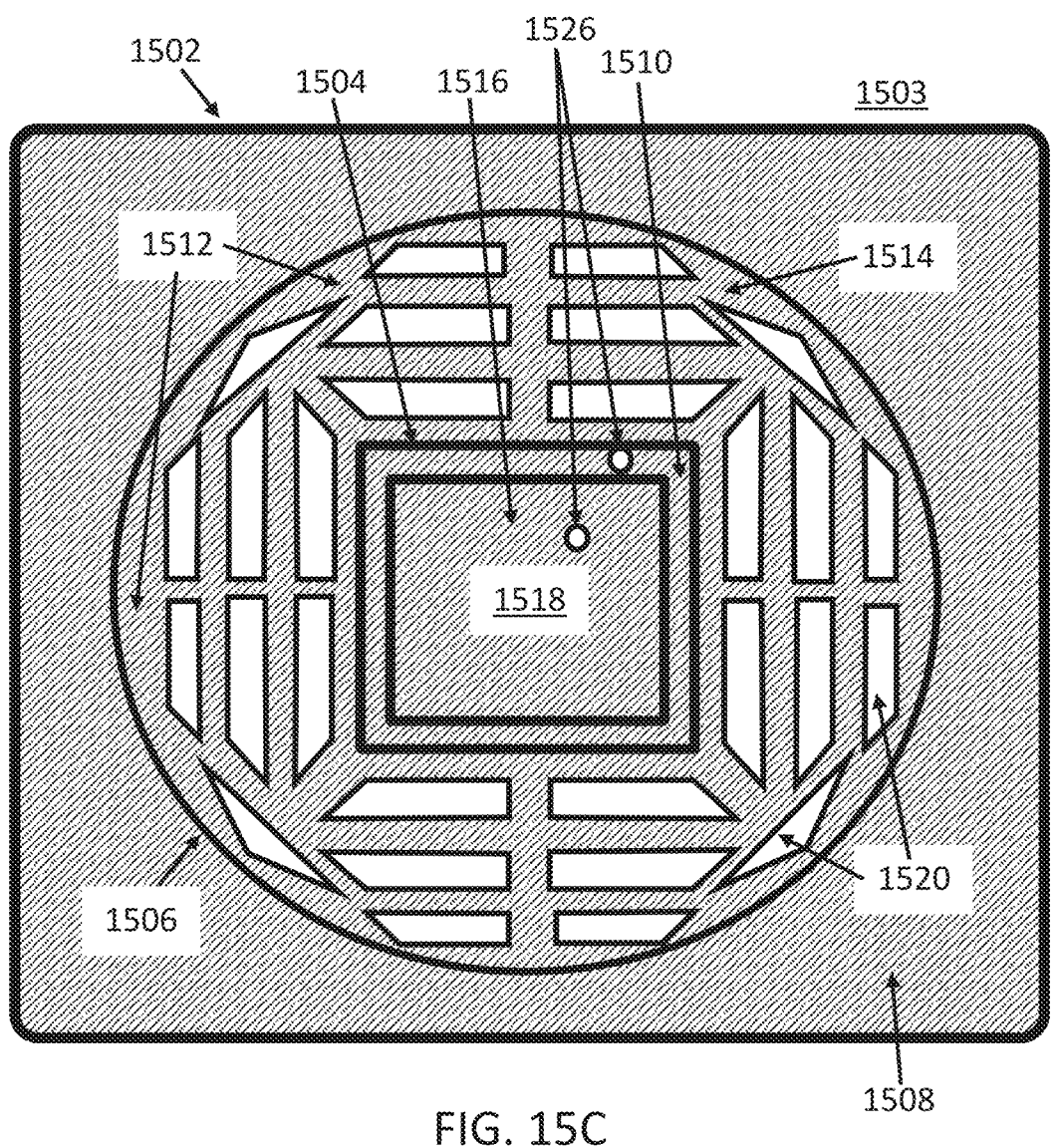
FIG. 15C is a top plan view of a basket platform with a riser interface protrusion and sunken platform sidewalls connected to a bottom support surface with drain holes for receiving and supporting a plant pot and coupling with a riser with a recess for receiving the basket platform with the riser interface protrusion, in accordance with one embodiment of the present invention.

Referring now to FIG. 15C, a top plan view 1501 of a basket platform 1502 with drainage holes (not shown) in a sunken plant pot platform 1512 formed by sunken platform sidewalls 1506 connected to a bottom surface 1516 of the sunken plant pot platform 1512, and a riser interface protrusion 1504 for coupling with a riser 1014 with a recess 1018 for receiving the basket platform 1502 with the riser interface protrusion 1504, is illustratively depicted in accordance with one embodiment of the present invention.

The platform 1502 can be formed from any appropriate materials, including, for example, rubber, plastic, formed metal, molded plastic, wood, or combinations of these and/or other materials, and is configured to support a plant pot (not shown) on a bottom surface 1514 of a sunken plant pot platform 1512 formed by raised sidewalls 1506 when the riser interface protrusion 1504 of the platform 1502 is coupled with the recess 1018 of a riser 1014 in accordance with embodiments of the present invention. The platform 1502 can include a lateral support platform extension 1508 to form an interference fit with the walls 1012 of the planter 1010 in accordance with embodiments of the present invention.

In various embodiments, the riser interface protrusion 1504 can extend downward from the top surface of the sunken plant pot platform 1512, and the top surface of the riser interface protrusion 1504 may be flat, pitched, and/or may form an indented reservoir portion configured to collect and store water similarly to the reservoir described with reference to element 18 of FIG. 1, in accordance with embodiments of the present invention.

In some embodiments, weep holes 1526 can be formed in the sidewalls 1510 of the protrusion 1504 and/or sidewalls 1506 of the sunken plant pot platform 1512 to provide drainage to prevent a water level from rising over the predetermined height (H) an/or (H') on the sidewalls 1510, 1506, respectively. In some embodiments the bottom surface 1516 can include weep holes 1526 to provide drainage for the lower portion 1522 of the protrusion 1504 and/or the lower portion 1524 of the sunken plant pot platform 1512 in accordance with aspects of the present invention. It is to be appreciated that the weep holes 1526 can be formed at any selected height and/or shape in the sidewalls 1510, 1506 and/or bottom surface 1516 of the protrusion 1504 and/or bottom surface 1514 of the sunken plant pot platform 1512 in accordance with embodiments of the present invention.

It is to be appreciated that although the platform 1502, the protrusion 1504, the raised sidewalls 1506, the lateral support platform extension 1508, the drain holes 1510, and the sunken plant pot platform 1512 are illustratively depicted as including a particular shape and size the platform 1502, the protrusion 1504, the raised sidewalls 1506, the lateral support platform extension 1508, and the sunken plant pot platform 1512 can be any shape (e.g., square, circle, octagon, hexagon, etc.) and can be scaled to any appropriate size such that the protrusion 1504 can fit within the recess 1018 and the platform 1502 can fit (e.g., loosely or snugly) within the planter 1010 in accordance with embodiments of the present invention. The above-described "fits" can include a contact fit, a snap fit, a securing fit (e.g., using a securing mechanism such as threads, bayonet, or other mechanical structures).

Figure 16A:
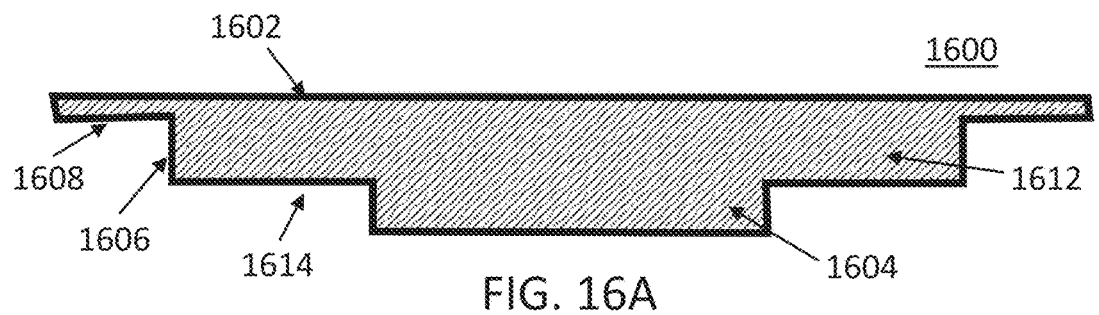
FIG. 16A is a side view of a basket platform with a riser interface protrusion and sunken platform sidewalls connected to a solid bottom support surface for receiving and supporting a plant pot and coupling with a riser with a recess for receiving the basket platform with the riser interface protrusion, in accordance with one embodiment of the present invention.

Referring now to FIG. 16A, a cross-sectional view 1600 of a basket platform 1602 with a sunken plant pot platform 1612 with a solid support surface 1614 and formed by sunken platform sidewalls 1606 connected to a bottom surface of the sunken plant pot platform 1612, is illustratively depicted in accordance with one embodiment of the present invention. The platform 1602 can include a riser interface protrusion 1604 for coupling with a riser 1014 with a recess 1018 configured for receiving the basket platform 1602 with the riser interface protrusion 1604.

The platform 1602 can be formed from any appropriate materials, including, for example, rubber, plastic, formed metal, molded plastic, wood, or combinations of these and/or other materials, and is configured to support a plant pot (not shown) on a bottom surface 1614 of a sunken plant pot platform 1612 formed by raised sidewalls 1606 when the riser interface protrusion 1604 of the platform 1602 is coupled with the recess 1018 of a riser 1014 in accordance with embodiments of the present invention. The platform 1602 can include a lateral support platform extension 1608 to form an interference fit with the walls 1012 of the planter 1010 in accordance with embodiments of the present invention. In some embodiments, the lateral support platform extension 1608 can include a gripping edge 1610 to improve an interference fit with walls 1012 of the planter 1010, and the gripping edge can be formed of any appropriate materials, including, for example, rubber, plastic, formed metal, molded plastic, wood, or combinations of these and/or other materials, in accordance with embodiments of the present invention.

In various embodiments, the riser interface protrusion 1604 can extend downward from the top surface 1614 of the sunken plant pot platform 1612, and the top surface of the riser interface protrusion 1604 may be flat, pitched, and/or may form an indented reservoir portion configured to collect and store water similarly to the reservoir described with reference to element 18 of FIG. 1, in accordance with embodiments of the present invention.

It is to be appreciated that although the platform 1602, the protrusion 1604, the raised sidewalls 1606, the lateral support platform extension 1608, and the sunken plant pot platform 1612 are illustratively depicted as including a particular shape and size the platform 1602, the protrusion 1604, the raised sidewalls 1606, the lateral support platform extension 1608, and the sunken plant pot platform 1612 can be any shape (e.g., square, circle, octagon, hexagon, etc.) and can be scaled to any appropriate size such that the protrusion 1604 can fit within the recess 1018 and the platform 1602 can fit (e.g., loosely or snugly) within the planter 1010 in accordance with embodiments of the present invention. The above-described "fits" can include a contact fit, a snap fit, a securing fit (e.g., using a securing mechanism such as threads, bayonet, or other mechanical structures).

Figure 16B:
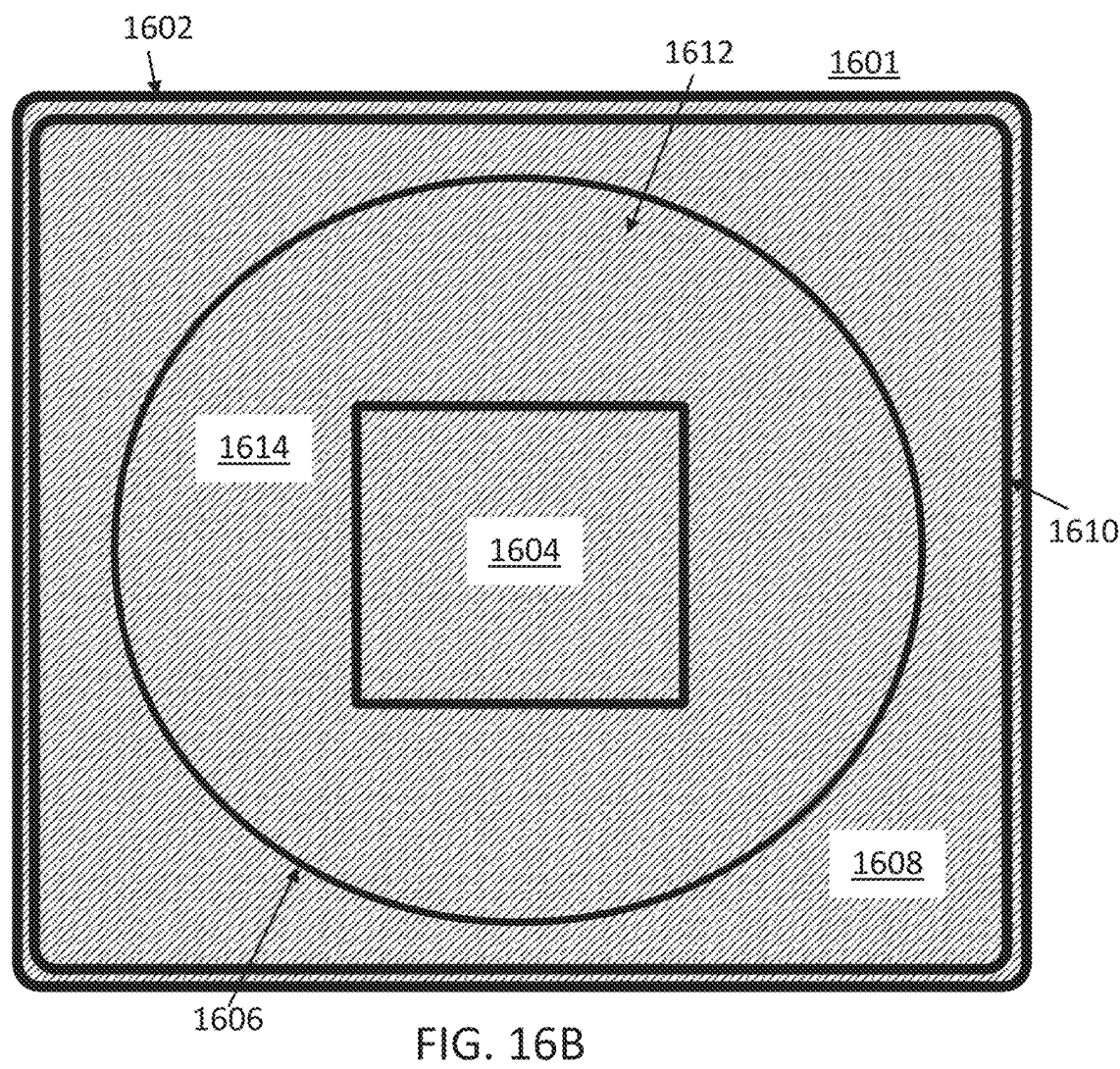
FIG. 16B is a top plan view of a basket platform with a riser interface protrusion and sunken platform sidewalls connected to a solid bottom support surface for receiving and supporting a plant pot and coupling with a riser with a recess for receiving the basket platform with the riser interface protrusion, in accordance with one embodiment of the present invention.

Referring now to FIG. 16B, a top perspective view 1601 of a basket platform 1602 with a sunken plant pot platform 1612 with a solid support surface 1614 and formed by sunken platform sidewalls 1606 connected to a bottom surface of the sunken plant pot platform 1612, and a riser interface protrusion 1604 for coupling with a riser 1014 with a recess 1018 for receiving the basket platform 1602 with the riser interface protrusion 1604, is illustratively depicted in accordance with one embodiment of the present invention.

The platform 1602 can be formed from any appropriate materials, including, for example, rubber, plastic, formed metal, molded plastic, wood, or combinations of these and/or other materials, and is configured to support a plant pot (not shown) on a bottom surface 1614 of a sunken plant pot platform 1612 formed by raised sidewalls 1606 when the riser interface protrusion 1604 of the platform 1602 is coupled with the recess 1018 of a riser 1014 in accordance with embodiments of the present invention.

In various embodiments, the riser interface protrusion 1604 can extend downward from the top surface of the sunken plant pot platform 1612, and the top surface of the riser interface protrusion 1604 may be flat, pitched, and/or may form an indented reservoir portion configured to collect and store water similarly to the reservoir described with reference to element 18 of FIG. 1, in accordance with embodiments of the present invention.

It is to be appreciated that although the platform 1602, the protrusion 1604, the raised sidewalls 1606, the lateral support platform extension 1608, and the sunken plant pot platform 1612 are illustratively depicted as including a particular shape and size the platform 1602, the protrusion 1604, the raised sidewalls 1606, the lateral support platform extension 1608, and the sunken plant pot platform 1612 can be any shape (e.g., square, circle, octagon, hexagon, etc.) and can be scaled to any appropriate size such that the protrusion 1604 can fit within the recess 1018 and the platform 1602 can fit (e.g., loosely or snugly) within the planter 1010 in accordance with embodiments of the present invention. The above-described "fits" can include a contact fit, a snap fit, a securing fit (e.g., using a securing mechanism such as threads, bayonet, or other mechanical structures).

Figure 17B:
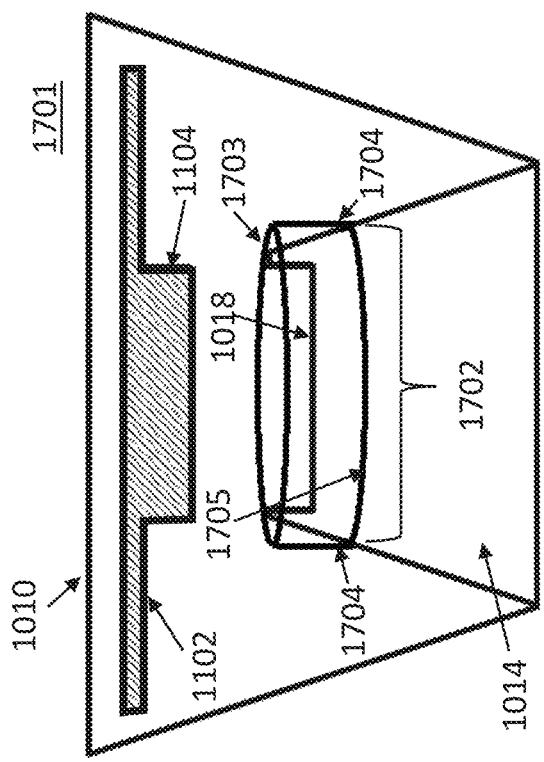
FIG. 17B is partial cross-sectional view of a planter having a riser with a recess for receiving a plate with a riser interface protrusion and the plate with the riser interface protrusion for supporting soil and/or a plant in a separated state with a ringed support structure, in accordance with one embodiment of the present invention.
Figure 17A:
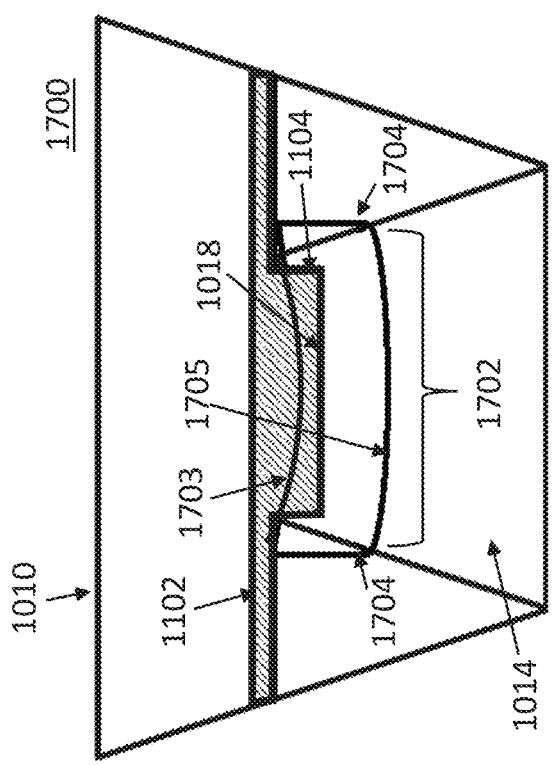
FIG. 17A is a partial cross-sectional view of a planter having a riser with a recess for receiving a plate with a riser interface protrusion and the plate with the riser interface protrusion for supporting soil and/or a plant in an assembled state with a ringed support structure, in accordance with one embodiment of the present invention.

Referring now to FIG. 17A, a partial cross-sectional view 1700 of a planter 1010 having a riser 1014 with a recess 1018 for receiving a plate 1102 with a riser interface protrusion 1104 for supporting soil and/or a plant, and a hollow columnar ringed support structure 1702 in an assembled state with the planter 1010 and plate 1102 is illustratively depicted in accordance with one embodiment of the present invention.

In some embodiments, the columnar ringed support structure 1702 can include a ringed top side 1703 and ringed bottom side 1705, which can be connected to each other by sidewalls 1704. The ringed support structure 1702 can be positioned such that the ringed bottom side 1705 rests on the sidewalls of the riser 1014 and the ringed top side 1703 is in contact with the bottom of the plate 1102 to provide stability and support for the plate 1102 when connected to the recess 1018 in the riser 1014 by the riser interface protrusion 1104. The ringed support structure 1702 can be formed from any appropriate materials, including, for example, rubber, plastic, formed metal, molded plastic, wood, or combinations of these and/or other materials, in accordance with various embodiments of the present invention.

Referring now to FIG. 17B, a partial cross-sectional view 1701 of a planter 1010 having a riser 1014 with a recess 1018 for receiving a plate 1102 with a riser interface protrusion 1104 for supporting soil and/or a plant, and a hollow columnar ringed support structure 1702 in an assembled state with the planter 1010, is illustratively depicted in accordance with one embodiment of the present invention.

In some embodiments, the columnar ringed support structure 1702 can include a ringed top side 1703 and ringed bottom side 1705, which can be connected to each other by sidewalls 1704. The ringed support structure 1702 can be positioned such that the ringed bottom side 1705 rests on the sidewalls of the riser 1014 and the ringed top side 1703 is in contact with the bottom of the plate 1102 to provide stability and support for the plate 1102 when the plate 1102 is lowered to connect to the recess 1018 in the riser 1014 by the riser interface protrusion 1104. The ringed support structure 1702 can be formed from any appropriate materials, including, for example, rubber, plastic, formed metal, molded plastic, wood, or combinations of these and/or other materials, in accordance with various embodiments of the present invention.

It should be understood that the elements depicted in the FIGS. can be mixed in different combinations to provide the desired functionality. For example, weep holes can be formed in one or more of the reservoir, the walls of the planter, walls of the riser, etc. In addition, the shape or configuration of the riser and the planter can be different. For example, the riser can have a square shape while the planter is circular, etc.

Having described preferred embodiments for planters with an elevated internal riser including a recess for receiving a platform with a riser interface protrusion and water preservation features (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is desired to be protected by Letters Patent is set forth.

What is claimed is:

1. A planter, comprising:
   an interior surface;
   a riser extending from a bottom of the interior surface and including a space between the riser and lateral walls of the planter, the riser including an open-top recess formed in a top portion of the riser; and
   a plate including a protrusion extending downward from a top surface of the plate, the protrusion being configured for coupling within the recess to secure the plate to the riser, and extending downward from the top surface of the plate to form an open top water reservoir including side walls and a solid bottom surface in a top surface of the protrusion, the solid bottom surface being water-tight.

2. The planter as recited in claim 1, wherein the recess includes side walls and a bottom support surface, the recess being configured to receive the protrusion to secure the plate to the riser.

3. The planter as recited in claim 1, wherein the recess includes side walls and a bottom support surface, the bottom support surface being configured to receive and support a plant therein.

4. The planter as recited in claim 1, wherein the plate is further supported by an interference fit between edges of the plate and the lateral walls of the planter.

5. The planter as recited in claim 1, wherein the plate includes a ringed gripping support structure around edges of the plate to secure the edges of the plate to the lateral walls of the planter.

6. The planter as recited in claim 1, wherein the plate includes a plurality of drainage holes.

7. A planter, comprising:
   an interior surface;
   a riser extending from a bottom of the interior surface and including a space between the riser and lateral walls of the planter, the riser including an open-top recess formed in a top portion of the riser; and
   a platform including a sunken central platform with platform side walls and a riser interface protrusion extending downward from a top surface of the sunken central platform and forming an open-top water reservoir including upwardly extending side walls and a solid bottom surface on a top surface of the protrusion, the solid bottom surface being water-tight, the riser interface protrusion being configured to be coupled within the recess to secure the platform to the riser.

8. The planter as recited in claim 7, wherein the sunken central platform is configured to receive and support a plant pot.

9. The planter as recited in claim 7, wherein the recess includes side walls and a bottom support surface, the recess being configured to receive the riser interface protrusion to secure the platform to the riser.

10. The planter as recited in claim 7, wherein the platform is further supported by an interference fit between a lateral support platform extension and the lateral walls of the planter.

11. The planter as recited in claim 7, further comprising a lateral support platform extension including a ringed gripping support structure around edges of a plate to secure the edges of the plate to the lateral walls of the planter.

12. The planter as recited in claim 7, further comprising a ringed support structure comprising a top ring and a bottom ring connected by a plurality of support beams, the ringed support structure being configured to be placed over the riser such that the bottom ring is configured to rest on walls of the riser and the top ring is configured to support the platform thereon.

13. A planter, comprising:
an interior surface;
a riser extending from a bottom of the interior surface and including a space between the riser and lateral walls of the planter, the riser including an open-top recess formed in a top portion of the riser;
a plate including a riser interface protrusion extending downward from a top surface of the plate and forming an open-top water reservoir including upwardly extending side walls and a solid bottom surface on a top side of the riser interface protrusion, the solid bottom surface being water-tight, the riser interface protrusion being configured to be coupled within the recess to secure the plate to the riser; and
a hollow columnar ringed support structure comprising a top side and a bottom side connected by sidewalls, the ringed support structure being configured to be placed over the riser such that the bottom side rests on walls of the riser and the top side supports the plate thereon.

* * * * *